United States Patent
Shabudin et al.

(10) Patent No.: US 10,960,453 B2
(45) Date of Patent: Mar. 30, 2021

(54) METHOD OF FORMING A CUP-SHAPED BODY FOR A BEVERAGE CAPSULE

(71) Applicant: Koninklijke Douwe Egberts B.V., Utrecht (NL)

(72) Inventors: Esak Shabudin, Banbury (GB); Andrew Halliday, Banbury (GB); Andrew Chapman, St Ives (GB); Stuart Banister, St Ives (GB); Simon Jelley, St Ives (GB)

(73) Assignee: Koninklijke Douwe Egberts B.V., Utrecht (NL)

( * ) Notice: Subject to any disclaimer, the term of this patent is extended or adjusted under 35 U.S.C. 154(b) by 285 days.

(21) Appl. No.: 15/526,268

(22) PCT Filed: Nov. 13, 2015

(86) PCT No.: PCT/EP2015/076620
§ 371 (c)(1),
(2) Date: May 11, 2017

(87) PCT Pub. No.: WO2016/075319
PCT Pub. Date: May 19, 2016

(65) Prior Publication Data
US 2017/0326617 A1    Nov. 16, 2017

(30) Foreign Application Priority Data

Nov. 14, 2014 (GB) .................................. 1420262.6

(51) Int. Cl.
*B21D 51/10* (2006.01)
*B29C 48/21* (2019.01)
(Continued)

(52) U.S. Cl.
CPC ............. *B21D 51/10* (2013.01); *B21D 22/24* (2013.01); *B21D 51/16* (2013.01); *B29C 48/21* (2019.02);
(Continued)

(58) Field of Classification Search
CPC .......... B21D 22/06; B21D 47/00; B21D 5/01; B21D 22/26; B21D 24/00; B21D 51/10;
(Continued)

(56) References Cited

U.S. PATENT DOCUMENTS 3,233,813 A    2/1966  Yoss
3,987,720 A   10/1976  Hill
(Continued)

FOREIGN PATENT DOCUMENTS

CA    2067515    2/1999
CN    1479692    3/2004
(Continued)

OTHER PUBLICATIONS

Chinese Search Report for Chinese Application No. 2014800263289, with English translation (3 pgs.).
(Continued)

*Primary Examiner* — Adam J Eiseman
*Assistant Examiner* — Mohammed S. Alawadi
(74) *Attorney, Agent, or Firm* — Fitch, Even, Tabin & Flannery LLP

(57) ABSTRACT

A method of forming a cup-shaped body for a beverage capsule comprising the steps of: a) in a first stage drawing a sheet of material into a cup-shaped body preform; and b) in a second stage transforming the cup-shaped body preform into the cup-shaped body; wherein after the first stage the cup-shaped body preform comprises a base and a preformed side wall which extends from the base to a rim; wherein the preformed side wall comprises: an outwardly-extending step
(Continued)

proximate the rim; a primary side wall section extending between the base and the outwardly-extending step; and a secondary side wall section extending between the outwardly-extending step and the rim; wherein in the second stage the preformed side wall is deformed such that the cup-shaped body comprises the base and a side wall which extends from the base to the rim; wherein the side wall comprises: an annular trough; a first side wall section extending between the base and the annular trough; and a second side wall section extending between the annular trough and the rim.

17 Claims, 22 Drawing Sheets

(51) Int. Cl.
| | | |
|---|---|---|
| *B21D 22/24* | (2006.01) | |
| *B21D 51/16* | (2006.01) | |
| *B29C 51/08* | (2006.01) | |
| *B65D 85/804* | (2006.01) | |
| *B29C 48/08* | (2019.01) | |
| *B29C 48/00* | (2019.01) | |
| *B29C 48/22* | (2019.01) | |
| *B65D 1/00* | (2006.01) | |
| *B65D 85/816* | (2006.01) | |

(52) U.S. Cl.
CPC .......... *B29C 51/08* (2013.01); *B65D 85/8043* (2013.01); *B29C 48/0017* (2019.02); *B29C 48/0021* (2019.02); *B29C 48/08* (2019.02); *B29C 48/22* (2019.02)

(58) Field of Classification Search
CPC ........ B21D 51/16; B21D 22/24; B29C 48/21; B29C 48/22; B29C 48/0021; B29C 48/0017; B29C 48/08; B29C 51/08; B65D 85/8043
USPC .......................................................... 72/348
See application file for complete search history.

(56) References Cited

U.S. PATENT DOCUMENTS

| | | | |
|---|---|---|---|
| 4,513,015 A | 4/1985 | Clough | |
| 4,762,514 A | 8/1988 | Yoshida | |
| 4,865,217 A | 9/1989 | Yoshimoto | |
| 5,098,751 A | 3/1992 | Tamura | |
| 5,178,293 A | 1/1993 | Suzuki | |
| 5,656,311 A | 8/1997 | Fond | |
| 5,897,899 A | 4/1999 | Fond | |
| 6,371,335 B1 | 4/2002 | MacEwen | |
| 6,461,697 B1 | 10/2002 | Slat | |
| 7,556,191 B2 | 7/2009 | Hewitt | |
| 7,658,141 B2 | 2/2010 | Masek | |
| 8,161,866 B2 | 4/2012 | Kollep | |
| 2001/0041702 A1 | 11/2001 | Crocker | |
| 2003/0071056 A1 | 4/2003 | Hale | |
| 2005/0109653 A1 | 5/2005 | Wnek | |
| 2007/0202237 A1* | 8/2007 | Yoakim ............... B65D 85/8043 426/590 |
| 2008/0299262 A1 | 12/2008 | Reati | |
| 2009/0320692 A1 | 12/2009 | Simanski | |
| 2010/0015307 A1 | 1/2010 | Abegglen | |
| 2010/0064899 A1 | 3/2010 | Aardenburg | |
| 2010/0239717 A1 | 9/2010 | Yoakim | |
| 2011/0020500 A1 | 1/2011 | Eichler | |
| 2011/0041702 A1 | 2/2011 | Yoakim | |
| 2011/0185910 A1 | 8/2011 | Ryser | |
| 2011/0186450 A1 | 8/2011 | Bonacci | |
| 2011/0259204 A1* | 10/2011 | Kaeser ............... B65D 85/8043 99/295 |
| 2011/0272317 A1 | 11/2011 | Wnek | |
| 2011/0297005 A1 | 12/2011 | Mariller | |
| 2012/0031794 A1 | 2/2012 | Ozanne | |
| 2012/0210878 A1 | 8/2012 | Mariller | |
| 2012/0225168 A1* | 9/2012 | Kamerbeek ........... A47J 31/369 426/112 |
| 2012/0272830 A1 | 11/2012 | Gugerli | |
| 2012/0301581 A1 | 11/2012 | Abegglen | |
| 2013/0087051 A1 | 4/2013 | Frydman | |
| 2013/0092910 A1 | 4/2013 | Seo | |
| 2013/0341478 A1 | 12/2013 | Mariller | |
| 2014/0087028 A1 | 3/2014 | Orsi | |
| 2014/0234494 A1* | 8/2014 | Doglioni Majer .... A47J 31/407 426/115 |
| 2016/0066591 A1 | 3/2016 | Halliday | |
| 2016/0075506 A1 | 3/2016 | Chapman | |
| 2016/0083174 A1 | 3/2016 | Halliday | |

FOREIGN PATENT DOCUMENTS

| | | |
|---|---|---|
| CN | 101043835 | 9/2007 |
| CN | 101287662 | 10/2008 |
| CN | 101432118 | 5/2009 |
| CN | 101432207 | 5/2009 |
| CN | 101454227 | 6/2009 |
| CN | 101686771 | 3/2010 |
| CN | 101970314 | 2/2011 |
| CN | 101992905 | 3/2011 |
| CN | 101992906 | 3/2011 |
| DE | 3641127 | 6/1988 |
| DE | 102008014758 | 10/2009 |
| EP | 468079 | 1/1992 |
| EP | 468080 | 1/1992 |
| EP | 512468 | 11/1992 |
| EP | 521186 | 1/1993 |
| EP | 0521510 | 1/1993 |
| EP | 524464 | 1/1993 |
| EP | 1344724 | 9/2003 |
| EP | 1440908 | 7/2004 |
| EP | 1369069 | 1/2006 |
| EP | 1654966 | 12/2006 |
| EP | 1700548 | 8/2007 |
| EP | 1839543 | 10/2007 |
| EP | 1816936 | 7/2008 |
| EP | 1849715 | 7/2009 |
| EP | 2098144 | 9/2009 |
| EP | 2165937 | 3/2010 |
| EP | 2279845 | 2/2011 |
| EP | 2284101 | 2/2011 |
| EP | 2289820 | 3/2011 |
| EP | 2308776 | 4/2011 |
| EP | 2100824 | 5/2011 |
| EP | 2284100 | 6/2011 |
| EP | 2347976 | 7/2011 |
| EP | 2151313 | 10/2011 |
| EP | 2210827 | 9/2012 |
| EP | 2562101 | 2/2013 |
| EP | 2287090 | 5/2013 |
| EP | 2607264 | 6/2013 |
| EP | 2631198 | 8/2013 |
| EP | 2631199 | 8/2013 |
| EP | 2650234 | 10/2013 |
| EP | 2489609 | 11/2013 |
| EP | 2712824 | 4/2014 |
| EP | 2721971 | 4/2014 |
| EP | 2757055 | 7/2014 |
| EP | 2757056 | 7/2014 |
| EP | 2868598 | 5/2015 |
| EP | 2892400 | 7/2015 |
| EP | 2960181 | 12/2015 |
| EP | 2570369 | 11/2016 |
| ES | 1076496 | 3/2012 |
| ES | 1077395 | 7/2012 |
| ES | 1078818 | 3/2013 |
| JP | H05132056 A | 5/1993 |
| JP | H05305360 | 11/1993 |
| JP | 2007510598 | 4/2007 |

(56) References Cited

FOREIGN PATENT DOCUMENTS

| | | |
|---|---|---|
| JP | 2008517838 | 5/2008 |
| JP | 2009538652 | 11/2009 |
| JP | 4399022 | 1/2010 |
| JP | 2010120161 | 6/2010 |
| JP | 2012530527 | 12/2012 |
| JP | 2015511506 | 4/2015 |
| JP | 2015526146 | 9/2015 |
| JP | 2015527914 | 9/2015 |
| KR | 20120121880 | 11/2012 |
| WO | 9729968 | 8/1997 |
| WO | 0226588 | 4/2002 |
| WO | 2004064585 | 8/2004 |
| WO | 2005047126 | 5/2005 |
| WO | 2005066040 | 7/2005 |
| WO | 2006045536 | 5/2006 |
| WO | 2006045537 | 5/2006 |
| WO | 2007039032 | 4/2007 |
| WO | 2007122208 | 11/2007 |
| WO | 2007137974 | 12/2007 |
| WO | 2008019203 | 2/2008 |
| WO | 2008148646 | 12/2008 |
| WO | 2008148650 | 12/2008 |
| WO | 2008155749 | 12/2008 |
| WO | 2009115474 | 9/2009 |
| WO | 2010006936 | 1/2010 |
| WO | 2010063644 | 6/2010 |
| WO | 2010066705 | 6/2010 |
| WO | 2010076048 | 7/2010 |
| WO | 2010128844 | 11/2010 |
| WO | 2010137946 | 12/2010 |
| WO | 2010137954 | 12/2010 |
| WO | 2011010263 | 1/2011 |
| WO | 2011061126 | 5/2011 |
| WO | 2011092301 | 8/2011 |
| WO | 2012100836 | 8/2012 |
| WO | 2012100976 | 8/2012 |
| WO | 2012104760 | 8/2012 |
| WO | 2012118367 | 9/2012 |
| WO | 2012120459 | 9/2012 |
| WO | 2012127233 | 9/2012 |
| WO | 2012144885 | 10/2012 |
| WO | 2013046014 | 4/2013 |
| WO | 2013053655 | 4/2013 |
| WO | 2013060918 | 5/2013 |
| WO | 2013092910 | 6/2013 |
| WO | 2013132435 | 9/2013 |
| WO | 2013136209 | 9/2013 |
| WO | 2013157924 | 10/2013 |
| WO | 2014012779 | 1/2014 |
| WO | 2014012783 | 1/2014 |
| WO | 2014029803 | 2/2014 |
| WO | 2014067507 | 5/2014 |
| WO | 2014118812 | 8/2014 |
| WO | 2014184651 | 11/2014 |
| WO | 2014184652 | 11/2014 |
| WO | 2014184653 | 11/2014 |
| WO | 2015101394 | 7/2015 |

OTHER PUBLICATIONS

Combined Search and Examination Report, dated Oct. 10, 2013 for United Kingdom Patent Application No. GB1308929.7 (7 pgs.).
Combined Search and Examination Report, dated Oct. 3, 2013 for United Kingdom Patent Application No. GB1308927.1 (5 pgs.).
Examination Report No. 2 for Standard Patent Application, dated Feb. 24, 2017 for Australian Patent Application No. 2014266922 (5 pgs.).
International Search Report and Written Opinion of the International Searching Authority, dated Jul. 29, 2014 for International Application No. PCT/IB2014/000858 (9 pgs.).
International Search Report, dated Aug. 28, 2014, for International Application No. PCT/IB2014/000852 (6 pgs.).
International Search Report, dated Sep. 16, 2014, for International Application No. PCT/IB2014/000957 (5 pgs.).

Notice of Reasons for Rejection, dated Aug. 24, 2016 for Japanese Patent Application No. 2016-512434, with English translation (10 pgs.).
Notice of Reasons for Rejection, with English translation, dated Aug. 24, 2016 for Japanese Patent Application No. 2016-512435 (12 pgs.).
Notice of Reasons for Rejection, with English translation, dated Aug. 24, 2016 for Japanese Patent Application No. 2016-512436 (8 pgs.).
Notification of the First Office Action, dated May 31, 2016 for Chinese Patent Application No. 201480026631.9, with English translation (14 pgs.).
Patent Examination Report No. 1, dated Mar. 2, 2016 for Australian Patent Application No. 2014266922 (3 pgs.).
Patent Examination Report No. 1, dated May 5, 2016 for Australian Patent Application No. 2014266920 (3 pgs.).
Requisition by the Examiner, dated Apr. 8, 2016 for Canadian Patent Application No. 2901582 (3 pgs.).
Requisition by the Examiner, dated Jul. 19, 2016 for Canadian Patent Application No. 2901664 (4 pgs.).
Requisition by the Examiner, dated Jun. 20, 2016 for Canadian Patent Application No. 2901561 (3 pgs.).
Search Report, dated Oct. 1, 2013 for United Kingdom Patent Application No. GB1308925.5 (4 pgs.).
Written Opinion of the International Searching Authority for International Application No. PCT/IB2014/000852 (6 pgs.).
Extract of the Wikipedia page on "Nespresso" bearing a date of Nov. 29, 2012, https://en.wikipedia.org/w/index.php?title=Nespresso&oldid=525539503, retrieved on Sep. 13, 2018 (D13 in Opposition) (8 pgs.).
Notice of Opposition to a European Patent, dated Oct. 11, 2018 for European Application No. 14730192.3 (7 pgs.).
Statement of Grounds for Notice of Opposition Filed Against EP2996521, dated Oct. 11, 2018 for European Application No. 14730192.3 (124 pgs.).
Combined Search and Examination Report, dated Apr. 22, 2015, for Applicaiton No. GB1420262.6 (7 pgs.).
International Search Report, dated Feb. 10, 2016, and Written Opinion of the International Searching Authority for International Application No. PCT/EP2015/076620 (12 pgs.).
The State Intellectual Property Office of P.R. China, Notification of the First Office Action and Search Report, with English Summary, for Chinese Application No. 201580072290.3, dated Apr. 10, 2018 (10 pgs.).
Chinese Patent Office, Office Action dated Mar. 28, 2017, from Chinese Patent Application No. 201480026319.X, with English translation (17 pgs.).
Notice of Opposition to a European Patent, dated Jan. 31, 2019 for European Application No. 14730192.3 (34 pgs.).
Notice of Opposition to a European Patent, dated Feb. 2, 2019 for European Application No. 14730192.3 (42 pgs.).
Notice of Opposition to a European Patent, dated Feb. 4, 2019 for European Application No. 14730192.3 (20 pgs.).
Notice of Opposition to a European Patent, dated Feb. 4, 2019 for European Application No. 14730192.3 (10 pgs.).
Coffee Capsule Stress and Deformation Analysis Performed by Optunity Ltd. on Dec. 6, 2018 (10 pgs.).
Extract of the Wikipedia page on "Deformation (engineering)" bearing a date of Feb. 21, 2013, https://en.wikipedia.org/w/index.php?title=Deformation_(engineering)&oldid=539464480, retrieved on Jan. 25, 2019 (5 pgs.).
Extract of the Wikipedia page on "Drawing (manufacturing)" bearing a date of Feb. 26, 2013, https://en.wikipedia.org/w/index.php?title=Drawing_(manufacturing)&oldid=540469785, retrieved on Jan. 25, 2019 (3 pgs.).
The Hague District Court, Judgment in Preliminary Relief Proceedings in the matter between Koninklijke Douwe Eberts B.V., versus Belmoca BVBA, case No. C/09/555970/KG ZA 18-694, dated Dec. 28, 2018, with English translation (62 pgs.).
Tribunal de Grande Instance de Paris, Judgment in Preliminary Relief Proceedings in the matter between Koninklijke Douwe Egberts B.V., versus Belmoca, case No. 352J-W-B7C-CNM2W, dated Jan. 24, 2019 (17 pgs.).

(56) References Cited

OTHER PUBLICATIONS

Response to the Oppositions filed against European patent No. EP2996521, dated Jun. 28, 2019 for European Application No. 14730192.3 (372 pgs.).

Notification of Reason for Refusal dated Aug. 6, 2019, for Korean Patent Application No. 10-2018-7030971, with English Translation (6 pgs.).

Examination Report, dated Aug. 30, 2019 for Australian Patent Application No. 2015344986 (3 pgs.).

Notice of Reasons for Rejection, dated Aug. 22, 2019 for Japanese Patent Application No. 2017-525840, with English Translation (8 pgs.).

Notice of Reasons for Rejection, dated Sep. 20, 2019 for Japanese Patent Application No. 2018-138423, with English Translation (16 pgs.).

Communication pursuant to Article 94(3) EPC and Annex to the Communication, dated Oct. 14, 2019 for European Application No. 14730191.5 (4 pgs.).

Written Submission in Opposition Proceedings filed against European patent No. EP2996521, dated Jan. 29, 2020 for European Application No. 14730192.3 (68 pgs.).

Written Submission in Opposition Proceedings filed against European patent No. EP2996521, dated Jan. 31, 2020 for European Application No. 14730192.3 (23 pgs.).

Extract of the Wikipedia page on "Lamination" published Mar. 18, 2013, https://en.wikipedia.org/w/index.hp?title=Lamination&oldid=545193864, retrieved on Oct. 23, 2019 (3 pgs.).

Annex to the Communication in Opposition Proceedings filed against European patent No. EP2996521, dated Sep. 10, 2019 for European Application No. 14730192.3 (28 pgs.).

United Kingdom Application No. GB 1308925.5, filed May 17, 2013 (33 pgs.).

United Kingdom Application No. GB 1308929.7, filed May 17, 2013 (28 pgs.).

Notification of the First Office Action dated Apr. 16, 2020, for Chinese Application No. 201910379467.4, with English Translation (15 pgs.).

Third Party Observations Under Article 115 EPC; dated Sep. 16, 2020; for European Patent Application No. EP14730191.5 (42 pgs.).

\* cited by examiner

METHOD OF FORMING A CUP-SHAPED BODY FOR A BEVERAGE CAPSULE

CROSS REFERENCE TO RELATED APPLICATIONS

This application is a U.S. national phase application of International Application No. PCT/EP2015/076620, filed Nov. 13, 2015, which claims benefit from Great Britain Application 1420262.6, filed Nov. 14, 2014, which are each hereby incorporated herein by reference in their entirety.

The present disclosure relates to a method of forming a cup-shaped body for a beverage capsule. The beverage capsule formed using the cup-shaped body may be used in a beverage preparation system of the type comprising a beverage preparation machine wherein the beverage capsule is designed for insertion into the beverage preparation machine to permit a pressurised liquid to be flowed through the capsule in order to produce a beverage from interaction with beverage ingredients contained within the capsule.

BACKGROUND

Beverage preparation systems which comprise a beverage preparation machine and a capsule containing beverage ingredients are known in the art. One such system is taught in EP 1700548, which discloses a capsule comprising a cup-like base body and a closing foil member. The capsule is designed for insertion in a beverage production device in which a liquid under pressure enters the capsule in order to interact with ingredients in the capsule to form a beverage which is output for consumption. The capsule of EP 1700548 is provided with a dedicated sealing member to prevent a by-pass flow of water around the exterior of the capsule in use. The sealing member is in the form of a hollow sealing member on the outer surface of the capsule, for example in the form of a step which is contacted on closure of an enclosing member of the beverage preparation machine.

The present disclosure provides an alternative method of forming parts of beverage capsules which may be used as part of such a beverage preparation system. The beverage capsule may be economical to produce and provide effective sealing in use.

SUMMARY OF THE DISCLOSURE

The present disclosure provides a method of forming a cup-shaped body for a beverage capsule comprising the steps of:
a) in a first stage drawing a sheet of material into a cup-shaped body preform; and
b) in a second stage transforming the cup-shaped body preform into the cup-shaped body;
wherein after the first stage the cup-shaped body preform comprises a base and a preformed side wall which extends from the base to a rim; wherein the preformed side wall comprises:
an outwardly-extending step proximate the rim;
a primary side wall section extending between the base and the outwardly-extending step; and
a secondary side wall section extending between the outwardly-extending step and the rim;
wherein in the second stage the preformed side wall is deformed such that the cup-shaped body comprises the base and a side wall which extends from the base to the rim; wherein the side wall comprises:

an annular trough;
a first side wall section extending between the base and the annular trough; and
a second side wall section extending between the annular trough and the rim.

The second side wall section may define a ridge zone located radially outwards of the annular trough and the ridge zone may be formed during the second stage by deformation of the outwardly-extending step and/or the secondary side wall section.

The outwardly-extending step may be angled at 90° to a central longitudinal axis of the cup-shaped body preform.

The primary side wall section may comprise a frusto-conical section proximate the base.

The frusto-conical section of the primary side wall section may be substantially or wholly unaffected by the transformation of the second stage and thereby may form a frusto-conical section of the first side wall section.

The primary side wall section may comprise a cylindrical section between the frusto-conical section and the outwardly-extending step.

The secondary side wall section may comprise a frusto-concical section, which is preferably divergent in the direction of the rim.

The annular trough may comprise an inner wall, an outer wall and a floor. The outer wall may be angled relative to the floor, such that an internal angle at a junction between the floor and the outer wall is from 90° to 120°, preferably 105°. Thus the seal with the enclosing member may be a tapered seal.

A floor of the annular trough may be raised relative to the rim. Alternatively, the floor of the annular trough may be substantially level with the rim.

The rim may be formed integrally with the cup-shaped body.

The rim may be formed by a rolled-over portion of the side wall. The rim may be formed during the first stage of the drawing when forming the cup-shaped body preform.

The annular trough may have an internal width of from 1.3 to 2.0 mm, preferably approximately 1.5 mm to 1.8 mm.

The annular trough may have an internal diameter of from 27.5 to 30.0 mm and an outer diameter of from 29.3 to 32.5 mm.

The cup-shaped body preform may be formed from an integral sheet of material.

The cup-shaped body preform is preferably formed by deep drawing the sheet of material, more preferably cold deep drawing the sheet of material.

Preferably the sheet of material comprises an aluminium material and may be substantially or wholly of an aluminium material (excepting lacquers and adhesive layers). Reference to aluminium includes aluminium alloys and the aluminium alloy may, for example, be of grade 3005, 3105, 8011 or 8079. Preferably, the aluminium alloy will have an 'O' temper rating.

Alternatively, the sheet of material may comprise a laminate material, preferably an aluminium layer laminated with one or more polymer layers. In this case, after formation, the one or more polymers layers are located towards an exterior of the cup-shaped body and the aluminium layer is provided towards an interior of the cup-shaped body.

The one or more polymer layers may comprise a single layer of a single polymer material or multiple layers of different polymer materials. Where multiple layers of different polymer materials are used, each layer may be applied separately when making up the sheet of material. However, it is preferred that the multiple layers of different polymer materials are first made up into a multilayer laminated polymer film which can then be laminated onto the aluminium layer by a suitable process, for example adhesive lamination.

The polymer materials of the one or more polymer layers may comprise materials selected from the group consisting of homopolymers, copolymers and mixtures thereof. By homopolymer is meant a polymer produced by the polymerization of a single monomer. By copolymer is meant a polymer produced by the polymerization of two or more monomers.

Suitable homopolymers include polyvinyl chloride (PVC), polypropylene (PP), low density polyethylene (LDPE), medium density polyethylene (MDPE), high density polyethylene (HDPE), polytetrafluoroethylene (PTFE), polyethylene terephthalate (PET), polychloroprene, polyisobutylene, and polyamides.

Suitable copolymers include fluorinated ethylene propylene (FEP), ethylene propylene diene monomer (EPDM), polyamides, thermoplastic copolyesters (TPC) and olefin block copolymers (OBC). These copolymers are preferably alternating copolymers or block copolymers. By alternating copolymer is meant a copolymer with regular alternating monomer units. By block copolymer is meant a copolymer comprising two or more homopolymer subunits linked by covalent bonds.

The one or more polymer layers may also incorporate tie layers and/or one or more barrier layers for inhibiting transmission of moisture and/or oxygen. A suitable barrier layer material is ethylene vinyl alcohol (EVOH).

In addition, optionally one or more lacquer layers or adhesive layers may be present in the sheet of laminated material. For example, an adhesive layer may be present between the aluminium layer and the one or more polymer layers. For example, an inner face of the aluminium layer may be coated with a lacquer layer, which may be for example of PVC.

The polymer materials preferably have a hardness of less than or equal to 40 D Shore Hardness, more preferably less than or equal to 30 D Shore Hardness. Advantageously, using relatively soft polymers for the outer surface of the cup-shaped body allows the material to deform around imperfections and features of an enclosing member to provide a more effective hydraulic seal.

The one or more polymer layers may have a total thickness greater than or equal to 80 microns. A range of the total thickness of from 80 microns to 300 microns may be used. However, a total thickness of 100 microns for the one or more polymer layers has been found to be particularly effective.

In one example the sheet of material (before drawing) comprises an aluminium layer comprising aluminium alloy of grade 8011 with a thickness of 100 microns and a coextruded polymer film of 100 microns thickness giving a total thickness for the sheet of 200 microns. The coextruded polymer film in this example is Flextrus WB 100ET available from Flextrus Ltd of Highbridge, United Kingdom which is a multilayer coextruded film having a structure of PE-tie layer-EVOH-tie layer-PE.

Advantageously, combining a relatively soft polymer(s) of less than or equal to 30 D Shore Hardness with a total thickness of 100 microns beneficially results in a material that can deform sufficiently to seal around moderately sized imperfections and features of an enclosing member without requiring too high a closing force on the enclosing member to operate.

The present disclosure also provides a beverage capsule formed by combining the cup-shaped body formed using the method described above and a lid. The beverage capsule may be filled with one or more beverage ingredients.

The lid may be sealed to the annular trough of the side wall. The lid may be sealed to an inner surface of a floor of the annular trough.

As discussed above, the cup-shaped body of the present method may be used to produce a beverage capsule that may be inserted into a beverage preparation machine of the type having an enclosing member that engages a flange of the inserted beverage capsule. According to the present disclosure, the annular trough may be dimensioned to partially or wholly receive a leading edge of the enclosing member therein on movement of the enclosing member into the closed position.

The side wall may be adapted to undergo plastic deformation during closure of the enclosing member.

The side wall may be adapted such that, in use, closure of the enclosing member deforms the side wall to cause the second side wall section to be forced inwardly against an outer face of the enclosing member to form a sealing interface with the outer face of the enclosing member.

The annular trough may be adapted to form a sealing interface with a leading edge of the enclosing member.

Advantageously, a sealing interface may be provided with both the leading edge and the outer face of the enclosing member. In addition, the deformation of the annular trough may also cause an outward pressure to be exerted by the side wall on the inner face of the enclosing member to form a further sealing interface.

The side wall may be adapted such that during closure of the enclosing member the side wall is plastically drawn over the leading edge of the enclosing member. Advantageously this may allow the side wall to be conformed to the shape of any grooves (or similar) provided in the leading edge.

On closure of the enclosing member a leading edge of the enclosing member may contact the outer wall of the annular trough and form a seal therewith.

The ridge zone may comprise an apex, and a leading edge of the enclosing member may comprise an inner rim and an outer rim and a recess located between the inner rim and the outer rim, wherein on closure of the enclosing member the apex of the ridge zone may be received in the recess between the inner rim and the outer rim.

The annular trough may be adapted to be nipped against a capsule holder of the beverage preparation machine part.

Prior to insertion, a floor of the annular trough may be raised relative to the rim. The floor of the annular trough may be offset from a distal end of the side wall by a distance from 0.1 to 2.0 mm. In one example, the offset may be relatively large, for example it may be from 1.55 to 2.0 mm. In a specific example the offset may be 1.85 mm. Where the offset is relatively large, the floor of the annular trough may be from 0.75 to 1.2 mm below an apex of the ridge zone (where present). In one example, the distance may be 0.9 mm. In another example, prior to insertion, the floor of the annular trough may be substantially level with the rim. For example the offset may be 0.1 to 0.5 mm. In one example the offset may be 0.2 mm. In this alternative arrangement the floor of the annular trough may be from 2.0 to 2.5 mm below an apex of the ridge zone (where present). In one example, the distance is 2.2 mm.

The side wall may be adapted such that, in use, closure of the enclosing member deforms the side wall to cause the floor of the annular trough to be brought substantially into alignment with the rim.

A leading edge of the enclosing member may comprise a plurality of grooves or indentations, and the side wall may be adapted such that the plastic deformation of the side wall conforms the annular trough of the side wall to the grooves or indentations to provide an effective seal. In one arrangement the plastic deformation of the side wall conforms the outer wall of the annular trough to the grooves or indentations to provide an effective seal.

The lid may be formed from aluminium, an aluminium alloy or a laminate comprising at least one layer formed from aluminium or an aluminium alloy. Alternatively, another, suitably ductile material could be utilised. The lid may further comprise a heat seal lacquer or heat seal layer to enhance sealing of the lid to the cup-shaped body.

Prior to insertion, the capsule may have a height of from 25 to 31 mm. In some aspects the height may be from 28.5 to 30 mm. Deformation of the capsule during use will tend to reduce the longitudinal height.

Preferably, the cup-shaped bodies may be shaped in a way that can be stacked and destacked easily prior to filling and assembly with the lids.

The capsule may form a single-use, disposable element.

The capsule may contain a beverage ingredient or mixture of beverage ingredients. As a non-limiting example, the beverage ingredient may comprise roasted ground coffee.

BRIEF DESCRIPTION OF THE DRAWINGS

The present disclosure will now be described in more detail, for exemplary purposes only, with reference to the accompanying drawings, in which.

DETAILED DESCRIPTION

Figure 3:
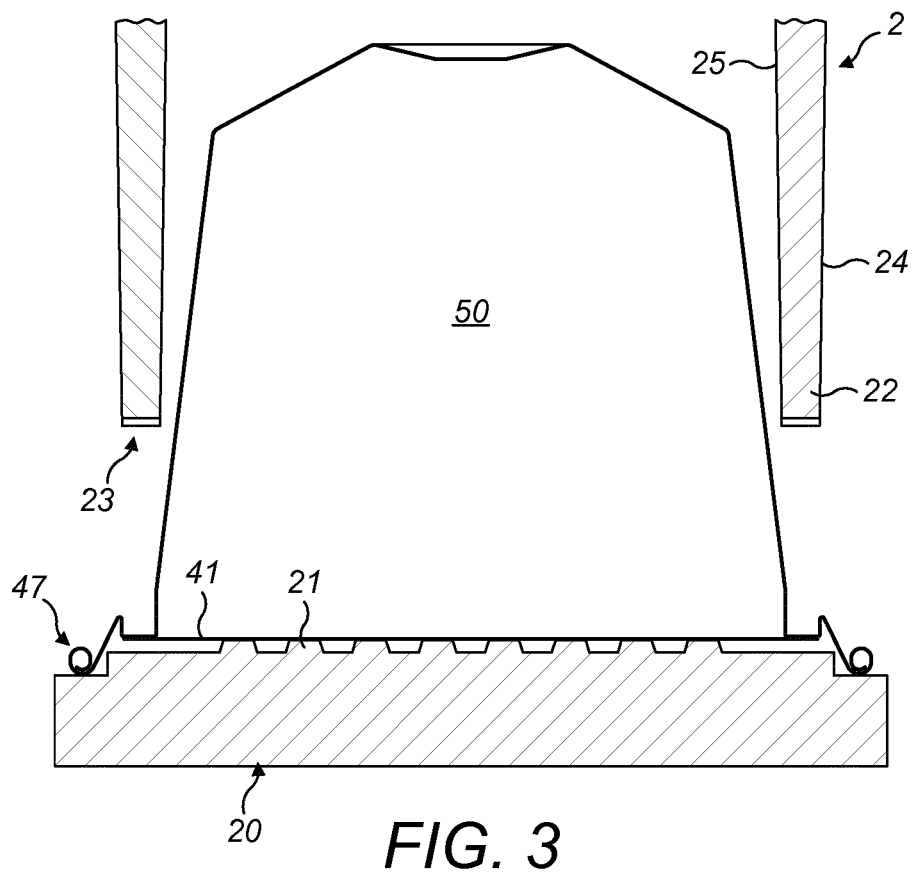
FIG. 3 is a schematic illustration of the capsule of FIG. 1 together with an enclosing member of a beverage preparation machine.
Figure 4:
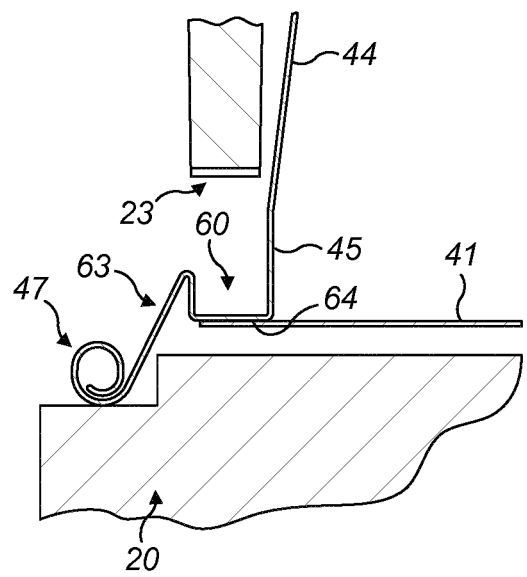
FIG. 4 is an enlarged view of a detail of FIG. 3.

FIG. 3 shows schematically a part of a beverage preparation system. The beverage preparation system comprises a beverage preparation machine and a capsule 1. Examples of capsules 1 made according to the present disclosure will first be described and their use as part of such a beverage preparation system. Thereafter will be described a method of forming the capsules 1—and in particular of forming parts of the capsules 1.

Figure 1:
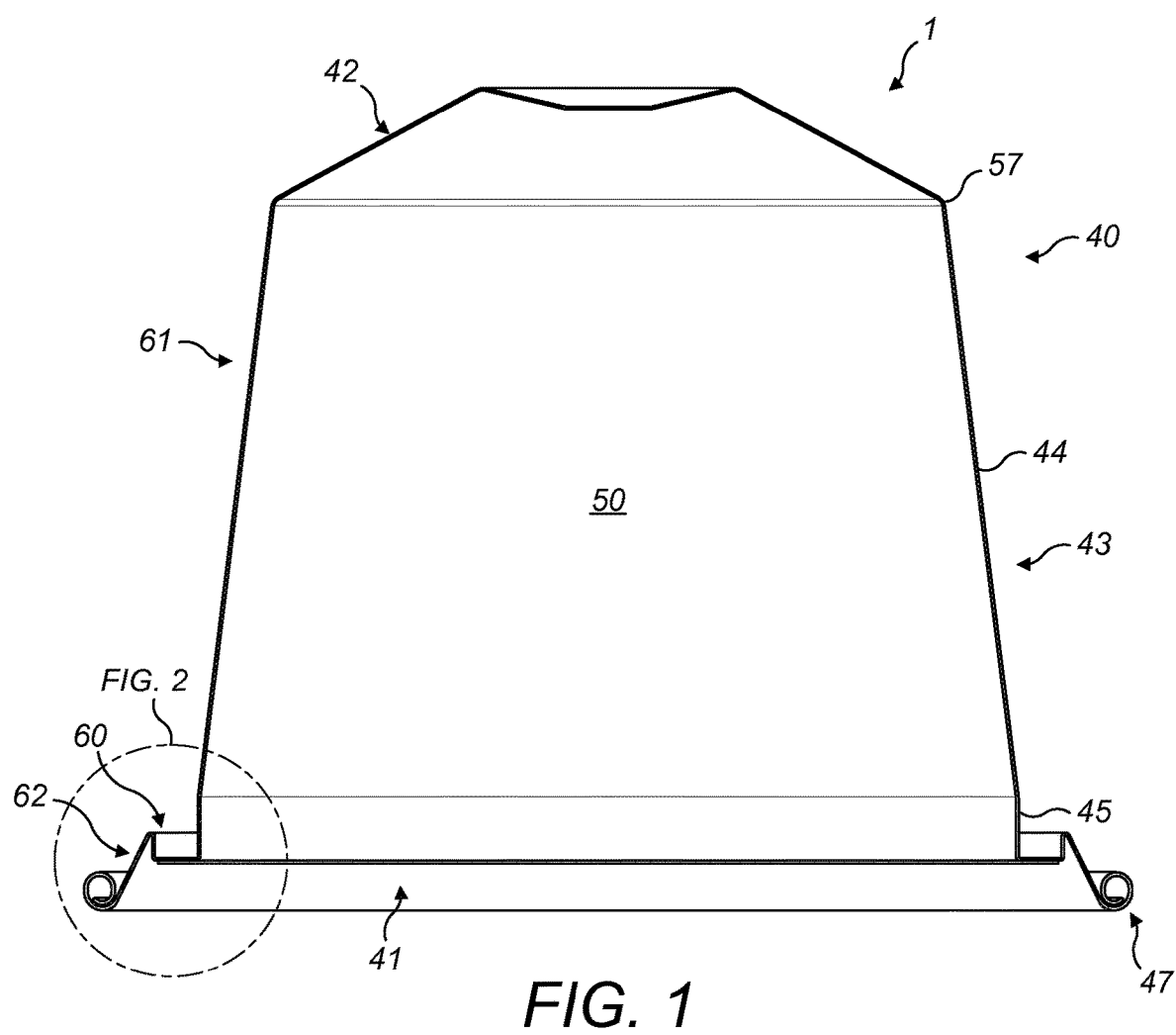
FIG. 1 is a cross-sectional view of a first example of capsule which may be formed according to the present disclosure.
Figure 2:
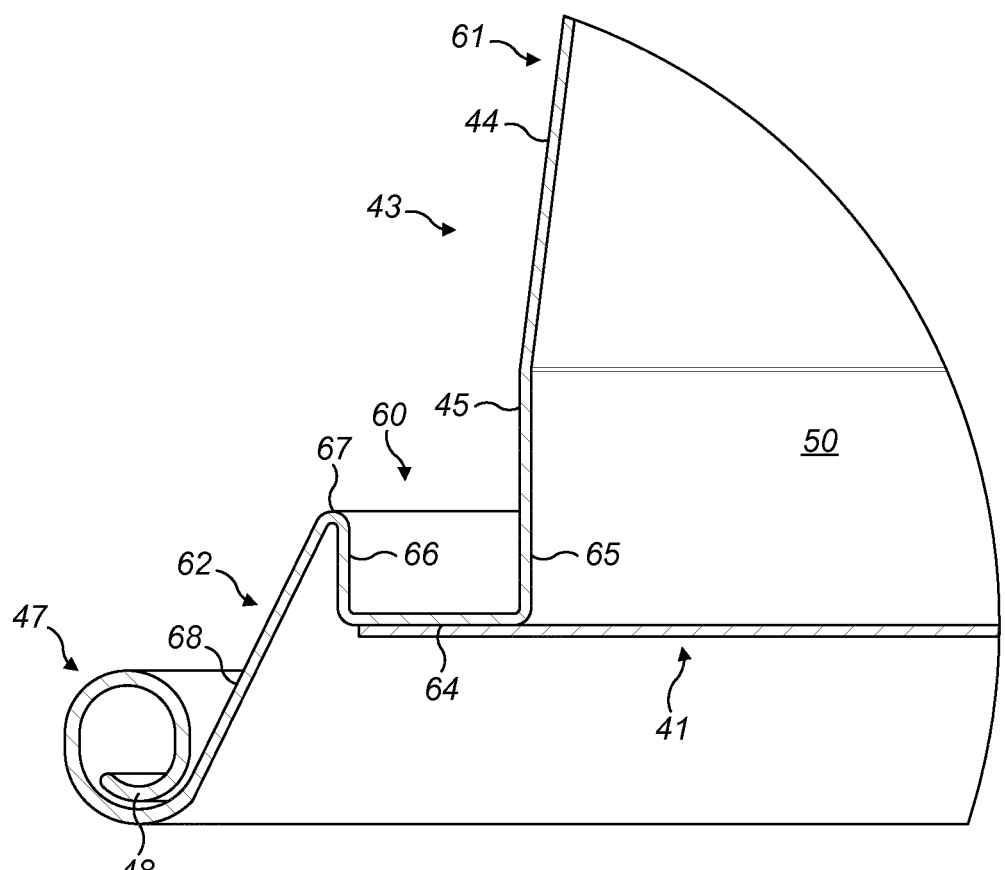
FIG. 2 is an enlarged view of a detail of FIG. 1.

FIGS. 1 and 2 show a first example of capsule 1. The capsule 1 will be described in more detail below but may have the general form of a cup-shaped body 40 having a base 42 at one end and a side wall 43 extending from the base 42 towards an opposed end which is closed-off by a lid 41.

As shown in FIG. 3, the beverage preparation machine comprises an enclosing member 2 and a capsule holder 20. The enclosing member 2 is selectively movable relative to a capsule holder 20 between an open position, to permit insertion of the capsule 1 into the beverage preparation machine, and a closed position, in which the enclosing member 2 sealingly engages the capsule 1 against the capsule holder 20 in a manner that will be described below.

The enclosing member 2 may be moved between the open and closed positions by means of a conventional mechanism well known in the art. For example, the means may involve a mechanical mechanism activated by a manually-movable lever or an automatic or semi-automatic mechanism where movement is driven by a motor. The enclosing member 2 may be moved while the capsule holder 20 remains stationary. Alternatively, the enclosing member 2 may remain stationary and the capsule holder 20 be moved. In a further alternative arrangement, both the enclosing member 2 and the capsule holder 20 may move during the opening and closing operations.

The enclosing member 2 and the capsule holder 20 in the closed position together define a receptacle 3 for holding the capsule 1 during a dispensing operation.

The beverage preparation machine may further comprise other conventional elements which are not illustrated in the accompanying drawings and are well known in the art of beverage preparation machines. For example, the beverage preparation machine may comprise either a facility for storing an aqueous medium, such as an internal reservoir, or a facility for connection to an external supply of aqueous medium, such as mains water. The aqueous medium will typically be water. A pump or equivalent may be provided for supplying the aqueous medium in a pressurised state to the capsule 1. The aqueous medium will typically be supplied at a pressure of up to 9 to 14 bar. A heater may be provided for heating the aqueous medium to a desired temperature. The heater may heat the aqueous medium in the reservoir (where present) or may heat the aqueous medium on-demand as it passes through a conduit or over a thermoblock to the receptacle 3. The beverage preparation machine may comprise base piercing means for piercing the base 42 of the capsule 1 to permit the aqueous medium to enter the capsule 1 and interact with the beverage ingredients therein. Alternatively, the capsule 1 may be provided with one or more pre-formed openings to allow entry of the aqueous medium from the receptacle 3 into the capsule 1.

The enclosing member 2 may be of the type described in EP 1700548 comprising an annular element 22 having a leading edge 23 in the form of an annular rim, an inner face 25 facing the receptacle 3 and an outer face 24 facing an exterior. The leading edge 23 may be provided with a plurality of grooves as taught in EP 1700548. An upper end (not shown) of the enclosing member 2 may be coupled to a supply of the aqueous medium and may provide a mounting for one or more perforation elements intended to pierce the base 42 of the capsule 1 in use.

The capsule holder 20 may be of the type described in EP 1700548 comprising relief elements 21 which are designed to tear and perforate the lid 41 of the capsule 1. The tearing of the lid 41 may occur due to internal pressurisation of the capsule 1 caused by inflowing aqueous medium. The relief elements 21 may have any protruding shape able to cause a partial tearing of the foil member, e.g. pyramids, needles, bumps, cylinders, or elongated ribs.

As shown in FIG. 1, the cup-shaped body 40 and the lid 41 of the capsule 1 together enclose a beverage ingredient chamber 50 which may be filled with a beverage ingredient or mixture of beverage ingredients. As a non-limiting example, the beverage ingredient may comprise roasted ground coffee.

In the illustrated example, the cup-shaped body 40 is made from aluminium or an aluminium alloy. However, other materials may be utilised, such as a laminate of aluminium or aluminium alloy and a polymer. The cup-shaped body 40 includes the base 42 and the side wall 43. There may be, as illustrated, a geometric discontinuity at the junction between the base 42 and the side wall 43, for example, in the form of a shoulder 57. Alternatively, the base 42 and the side wall 43 may have a smooth geometric transition.

The cup-shaped body 40 may have a thickness in the range of 80 to 500 microns. The thickness of the material may be varied throughout the cup-shaped body 40. In the illustrated example the thickness is 100 microns.

The side wall 43 is provided with an annular trough 60 which is dimensioned to receive, partially or wholly, the leading edge 23 of the enclosing member 2 on movement of the enclosing member 2 into the closed position. A first side wall section 61 is provided extending between the base 42 and the annular trough 60 and a second side wall section 62 is provided extending between the annular trough 60 and a distal end of the side wall 43 of the capsule 1.

The annular trough 60 may be defined by an inner wall 65, an outer wall 66 and a floor 64 which extends there between. The inner wall 65 and outer wall 66 may, prior to insertion of the capsule 1 in the beverage preparation machine, extend perpendicularly to the floor 64. The inner wall 65 may be formed by a portion of the first side wall section 61.

A ridge zone 63 is located radially outwards of the annular trough 60. The ridge zone 63 may comprise an annular projection which extends back in the general direction of the base 42 such that an apex 67 of the ridge zone 63 is raised above the level of the floor 64 of the annular trough 60. The apex 67 may be raised above the floor 64 by a distance from 0.75 to 2.5 mm. As illustrated in this example, the distance is 0.9 mm. The ridge zone 63 may be formed to have an inner wall provided by the outer wall 66 of the annular trough 60 and an outer wall 68 formed by at least a portion of the second side wall section 62.

The side wall 43, including the annular trough 60 and the ridge zone 63 may be formed integrally. Further, the cup-shaped body 40 including the side wall 43 and the base 42 may be formed integrally.

The annular trough 60 may have an internal width of from 1.3 to 2.0 mm. Typically, the internal width of the annular trough 60 is chosen to be marginally greater than the breadth of the leading edge 23 of the annular element 22. In one example, the annular trough 60 has an internal width of approximately 1.5 mm to 1.8 mm.

The annular trough 60 may have an internal diameter of from 27.5 to 30.0 mm (that is the diameter of the surface of the inner wall 65 facing into the annular trough 60) and an outer diameter of from 29.3 to 32.5 mm (that is the diameter of the surface of the outer wall 66 facing into the annular trough 60). Optionally, the internal diameter may be chosen so there is a slight interference fit between the inner wall 65 and the outer face 24 of the enclosing member 2 on closure. This helps to ensure good alignment of the annular trough 60 with the enclosing member 2.

As illustrated, the lid 41 is sealed to the annular trough 60. In particular, the lid 41 is sealed to an inner surface of the floor 64 of the annular trough 60. The floor 64 of the annular trough 60 is raised relative to a distal end of the side wall 43. Consequently, the lid 41 is also raised relative to the distal end of the side wall 43. The floor 64 may be offset from the distal end of the side wall 43 by a distance from 0.1 to 2.0 mm as described previously. As illustrated, the offset is 1.85 mm. Sealing the lid 41 to the floor 64 helps to ensure that the enclosing member 2 does not bear down on a hollow part of the capsule 1 so as to trap beverage ingredients in between the leading edge 23 and the capsule holder 20 which could have a detrimental effect on the fluid-tightness of the seal.

The lid 41 may be formed from aluminium, an aluminium alloy or a laminate containing aluminium.

The first side wall section 61 may comprise a frustoconical section 44 proximate the base 42 and a cylindrical section 45 distal the base 42, wherein a portion of the cylindrical section 45 forms the inner wall 65 of the annular trough 60.

The capsule 1 may be provided with a rim 47 formed at an end of the cup-shaped body 40 remote from the base 42, i.e. at the distal end of the side wall 43. The rim 47 may be formed integrally with the cup-shaped body 40. In the illustrated example, the rim 47 is formed by a rolled-over portion 48 of the side wall 43.

In use of the beverage preparation system the enclosing member 2 is first moved into the open position and the capsule 1 is inserted into a location in between the capsule holder 20 and the enclosing member 2. The enclosing member 2 is then closed so as to sealingly engage the enclosing member 2 with the capsule 1. During this step the base 42 of the capsule 1 may be pierced by the perforation elements of the enclosing member 2.

Pressurised aqueous medium (which may be heated, at ambient temperature or chilled) is then flowed into the capsule 1 to produce a beverage from interaction with the beverage ingredients. During this step internal pressurisation of the beverage ingredient chamber 50 causes the lid 41 to be deformed outwardly against the relief elements 21 of the capsule holder 20 resulting in at least partial tearing of the lid 41 which opens up an exit path from the capsule 1 for the beverage.

The beverage is then output for consumption.

Figure 5:
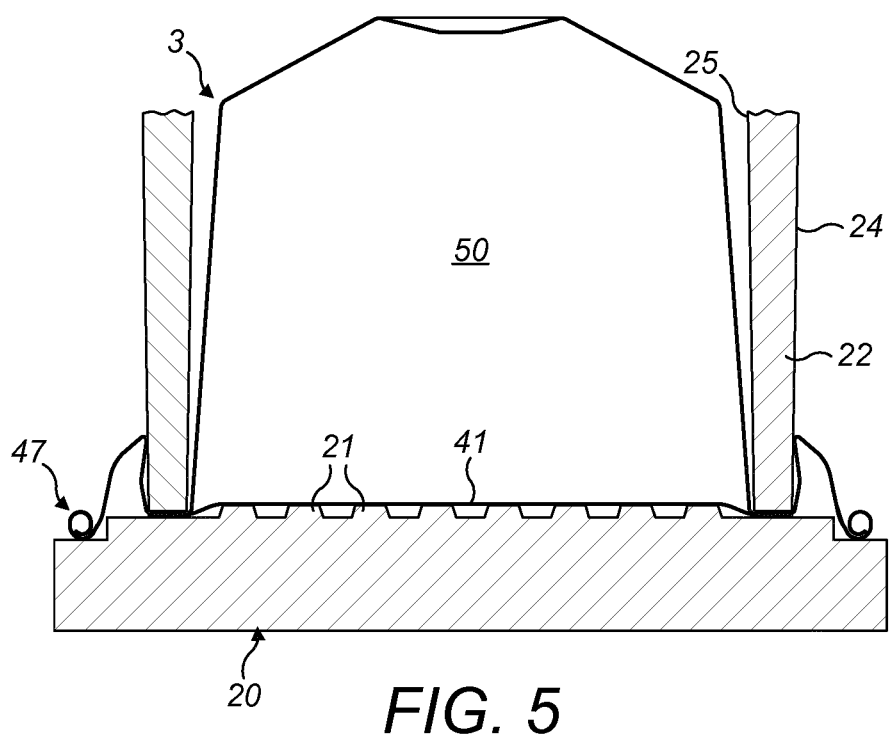
FIG. 5 is a schematic illustration of the arrangement of FIG. 3 with the enclosing member in a closed position.
Figure 6:
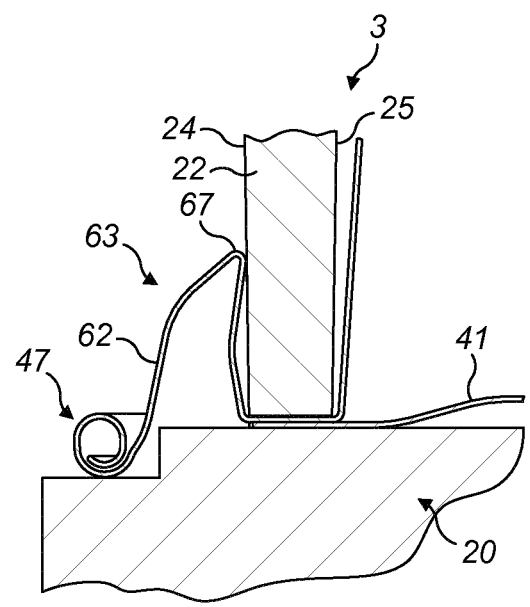
FIG. 6 is an enlarged view of a detail of FIG. 5.
Figure 7:
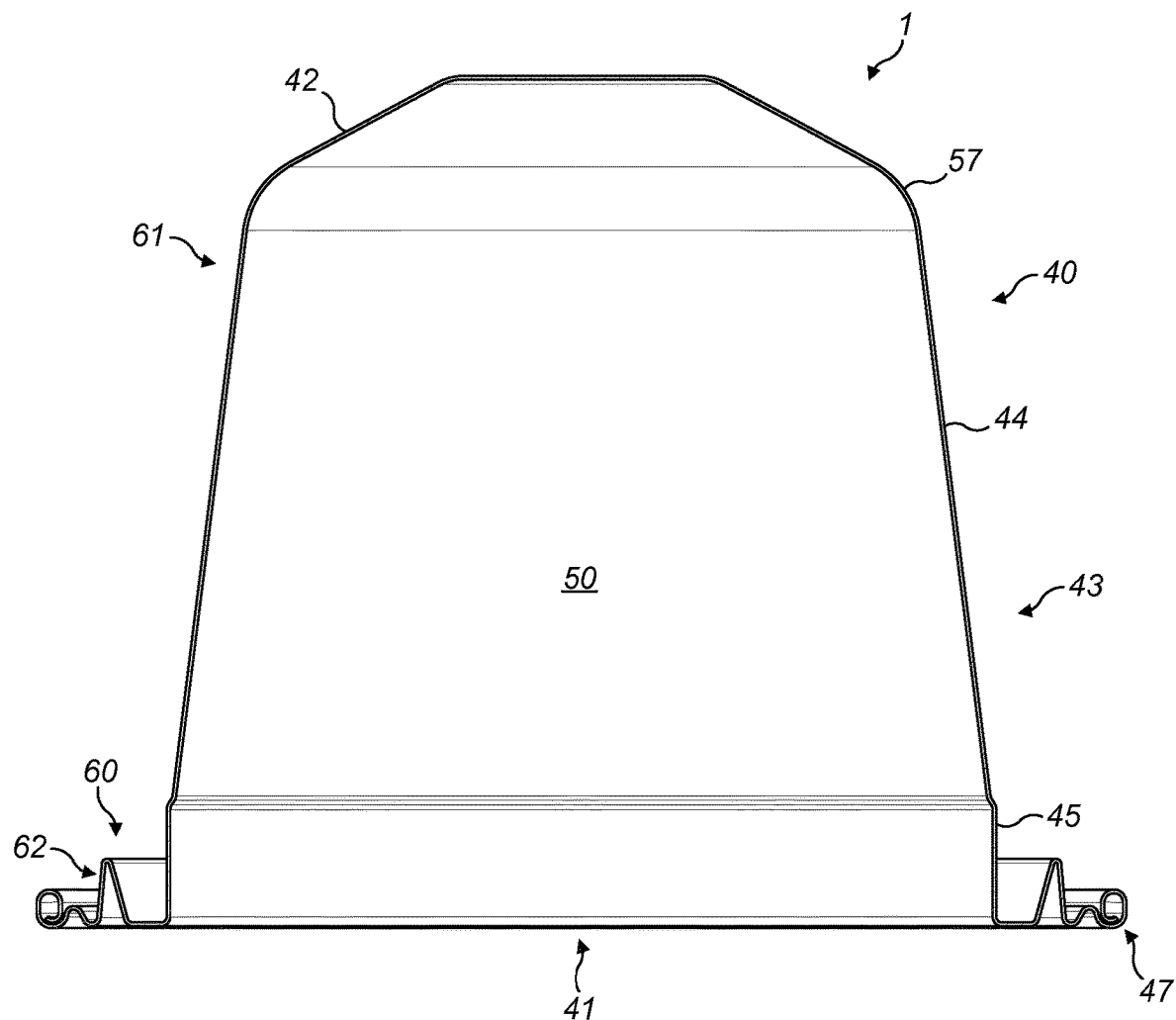
FIG. 7 is a cross-sectional view of a second example of capsule which may be formed according to the present disclosure.
Figure 8:
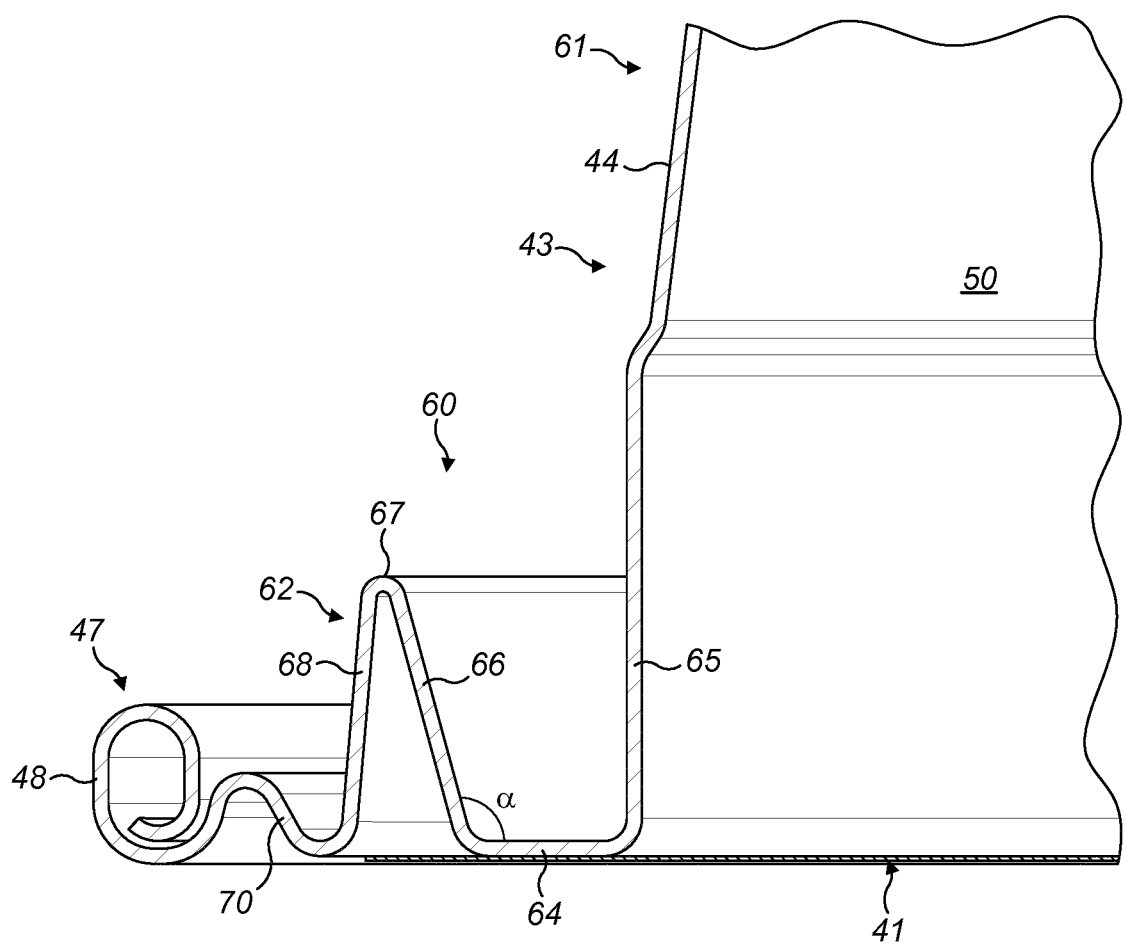
FIG. 8 is an enlarged view of a detail of FIG. 7.

As shown in FIGS. 5 and 6, during the step of closing the enclosing member 2 relative to the capsule holder 20 the side wall 43 of the capsule 1 is contacted by the enclosing member 2 to deform the side wall 43. In particular, the leading edge 23 enters the annular trough 60 and bears on the floor 64 and/or the inner wall 65 and/or the outer wall 66. The floor 64 is driven downwards by the action of the enclosing member 2 to nip the floor 64 (and the lid 41 sealed to the floor 64) against the capsule holder 20. The leading edge 23 may also act to pinch the material of the side wall 43 during this movement which consequently causes the ridge zone 63 to be pivoted inwards to bring the apex 67 of the ridge zone 63 and/or the outer wall 66 of the annular trough 60 into sealing engagement with the outer face 24 of the annular element 22 as shown in FIG. 6. Importantly, the initial point of contact between the leading edge 23 and the floor 64 is axially spaced from the capsule holder 20 such that there is room for the side wall 43 to deform downwards towards the capsule holder 20 enough to allow for inward pivoting of the ridge zone 63 before the side wall 43 is nipped against the capsule holder 20.

The induced movement of the side wall 43 causes the side wall 43 to undergo plastic deformation. In particular, as the side wall 43 is deformed downwards, the side wall 43 (in particular portions of the annular trough 60) may be plastically drawn over the leading edge 23 of the enclosing member 2 which encourages the material of the side wall 43 to be closely conformed to the grooves of the leading edge 23. Thus, the annular trough 60 may form a sealing interface with the leading edge 23 of the enclosing member 2.

Further, deformation of the annular trough 60 may also cause an outward pressure to be exerted by the side wall 43 on the inner face 25 of the enclosing member 2 to form a further sealing interface.

FIGS. 7 to 12 illustrate a second example of capsule 1. Features corresponding to those of the first example are denoted by corresponding reference signs. Features of the first example and this example may be interchanged and combined as desired. In addition, in the following description only differences between the examples will be described in detail. In other respects the reader is directed to the description of the prior example.

The cup-shaped body 40 differs from that of the first example in the configuration and geometry of the annular trough 60. As in the first example, the annular trough 60 is dimensioned to receive, partially or wholly, the leading edge 23 of the enclosing member 2 on movement of the enclosing member 2 into the closed position. The inner wall 65 of the annular trough 60, as before, is substantially perpendicular to the floor 64. However, in contrast, the outer wall 66 is angled relative to the floor 64, such that an internal angle α at a junction between the floor 64 and the outer wall 66 is from 90° to 120°, preferably 105°.

The ridge zone 63 is again located radially outwards of the annular trough 60 and comprises an annular projection which extends back in the general direction of the base 42 such that an apex 67 of the ridge zone 63 is raised above the level of the floor 64 of the annular trough 60. The apex 67 may be raised above the floor 64 by a distance from 0.75 to 2.5 mm. As illustrated in this example, the distance is 2.2 mm. The ridge zone 63 may be formed to have an inner wall provided by the angled outer wall 66 of the annular trough 60 and an outer wall 68 formed by at least a portion of the second side wall section 62. As shown most clearly in FIG. 8, the second side wall section 62 may comprise between the outer wall 68 and the rolled-over portion 48 of the rim 47 an additional annular ridge 70 which may provide additional stiffness to the outer portion of the flange. The height of the additional annular ridge 70 may be 0.7 to 0.8 mm.

The side wall 43, including the annular trough 60 and the ridge zone 63 may be formed integrally. Further, the cup-shaped body 40 including the side wall 43 and the base 42 may be formed integrally.

The annular trough 60 may have an internal width of from 1.3 to 2.0 mm. As illustrated, the annular trough 60 has an internal width of approximately 1.5 mm to 1.8 mm.

As illustrated, the lid 41 is sealed to the annular trough 60. In particular, the lid 41 is sealed to an inner surface of the floor 64 of the annular trough 60. The floor 64 of the annular trough 60 is substantially level with a distal end of the side wall 43 prior to insertion. As illustrated the offset from the distal end of the side wall 43 and the lid is only 0.2 mm.

Figure 9:
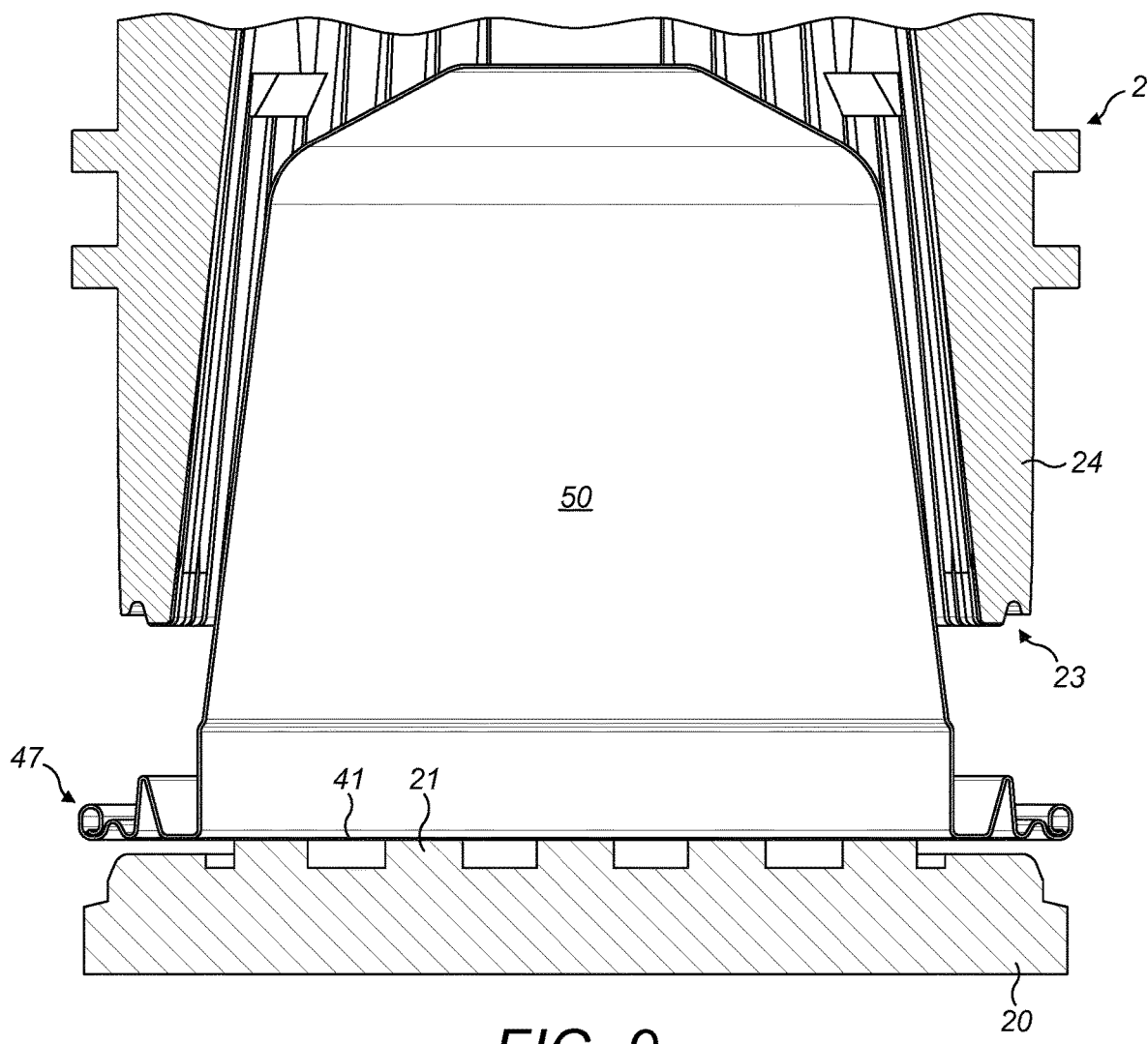
FIG. 9 is a schematic illustration of the capsule of FIG. 7 together with an enclosing member of a beverage preparation machine.
Figure 10:
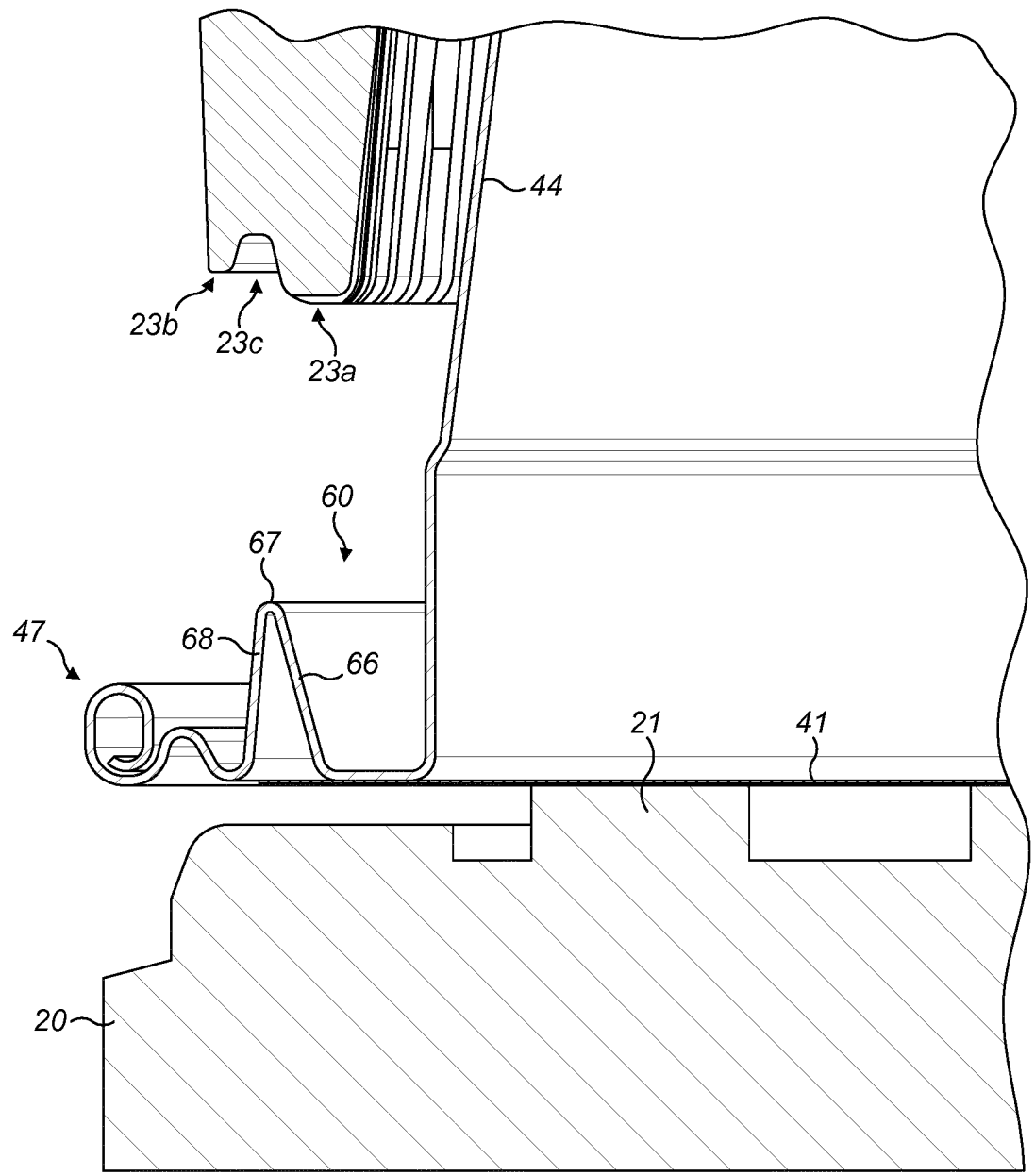
FIG. 10 is an enlarged view of a detail of FIG. 9.

In use of the beverage preparation system, as shown in FIGS. 9 to 12, as before the enclosing member 2 is first moved into the open position and the capsule 1 is inserted into a location in between the capsule holder 20 and the enclosing member 2. FIG. 9 illustrates that the leading edge 23 of the enclosing member 2 may comprise an inner rim 23a and an outer rim 23b which are concentric and spaced apart from one another to define a recess 23c there between, which may be generally annular (although may have interruptions around its circumference).

Figure 11:
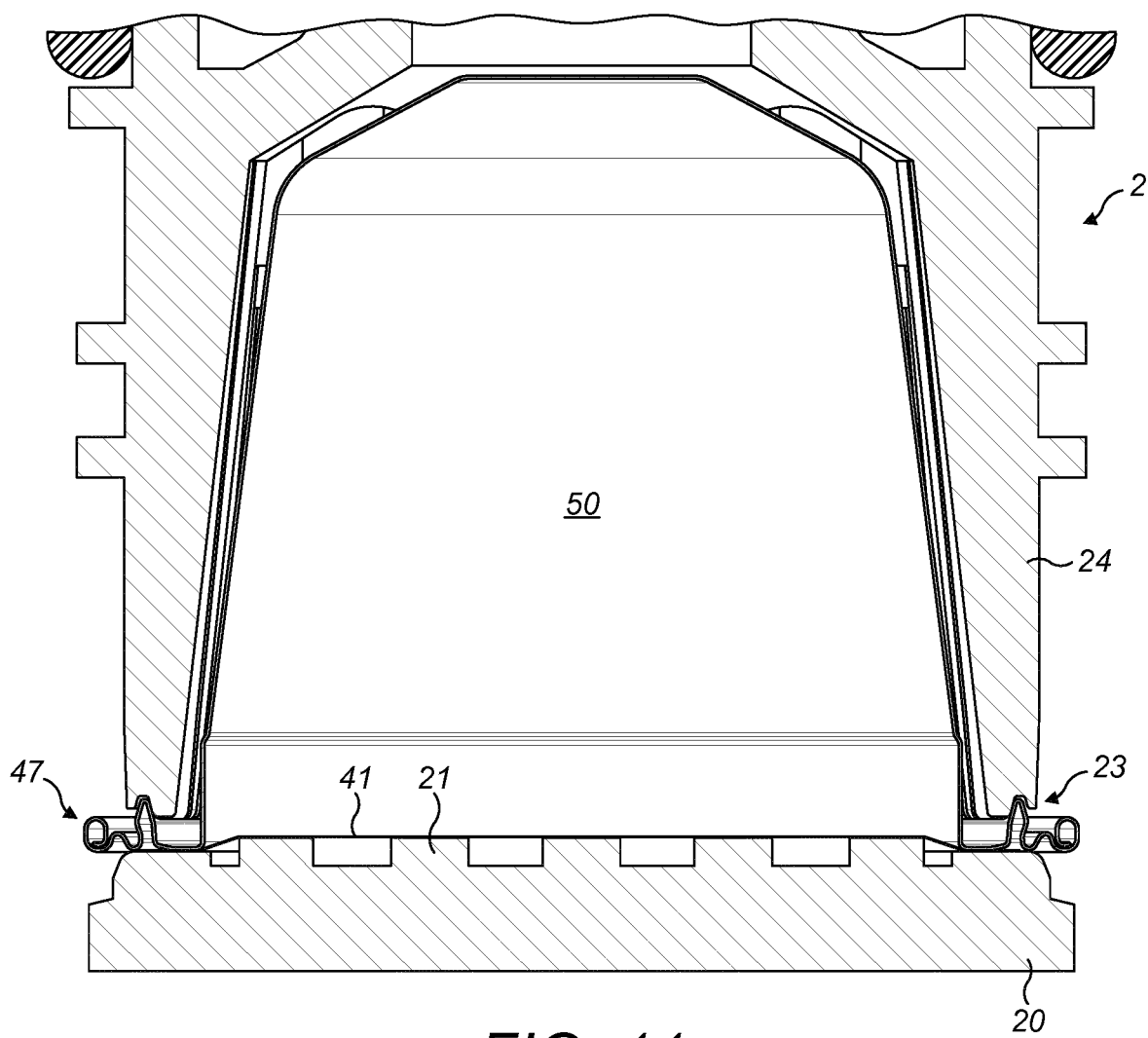
FIG. 11 is a schematic illustration of the arrangement of FIG. 9 with the enclosing member in a closed position.
Figure 12:
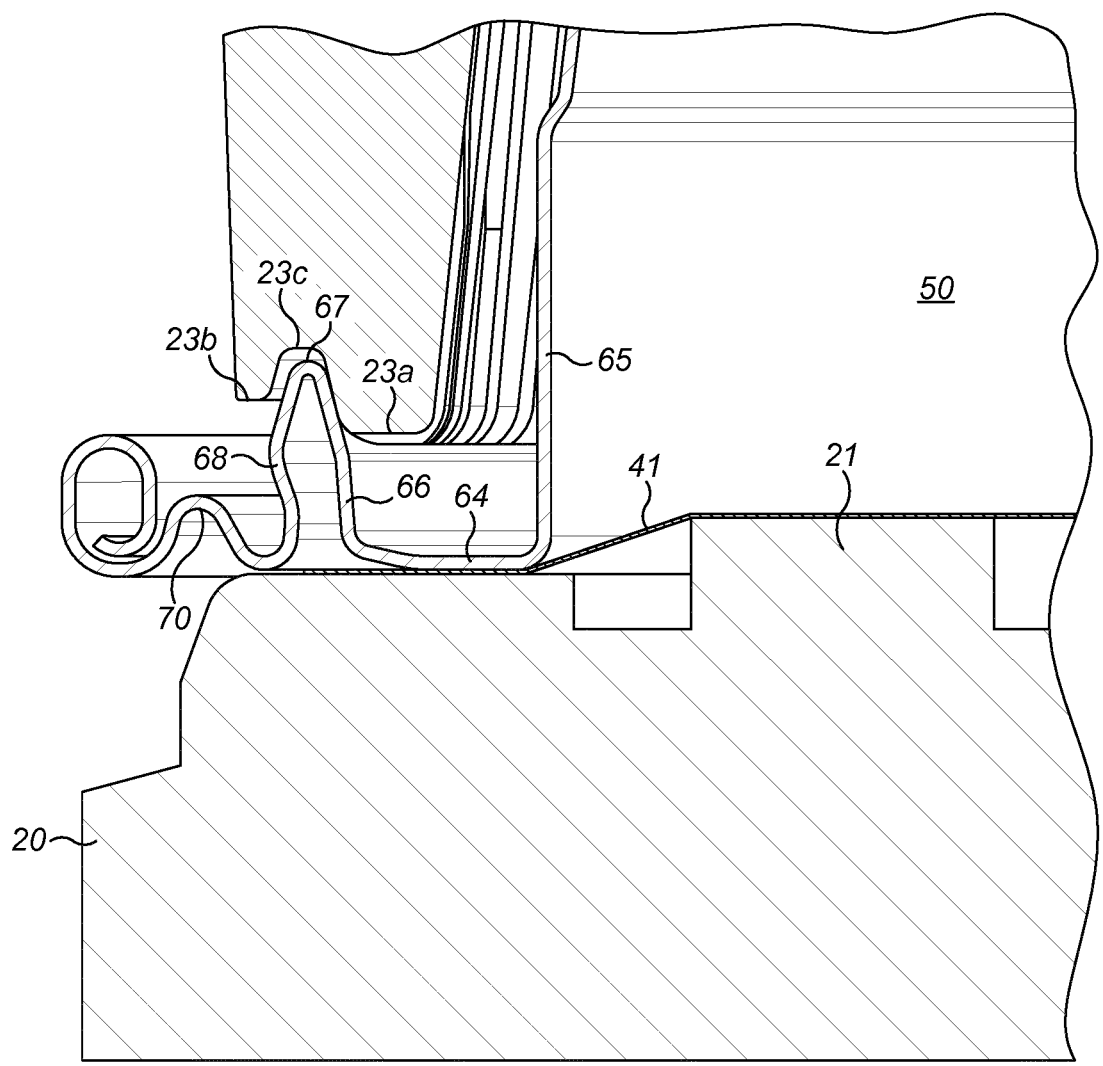
FIG. 12 is an enlarged view of a detail of FIG. 11.
Figure 13:
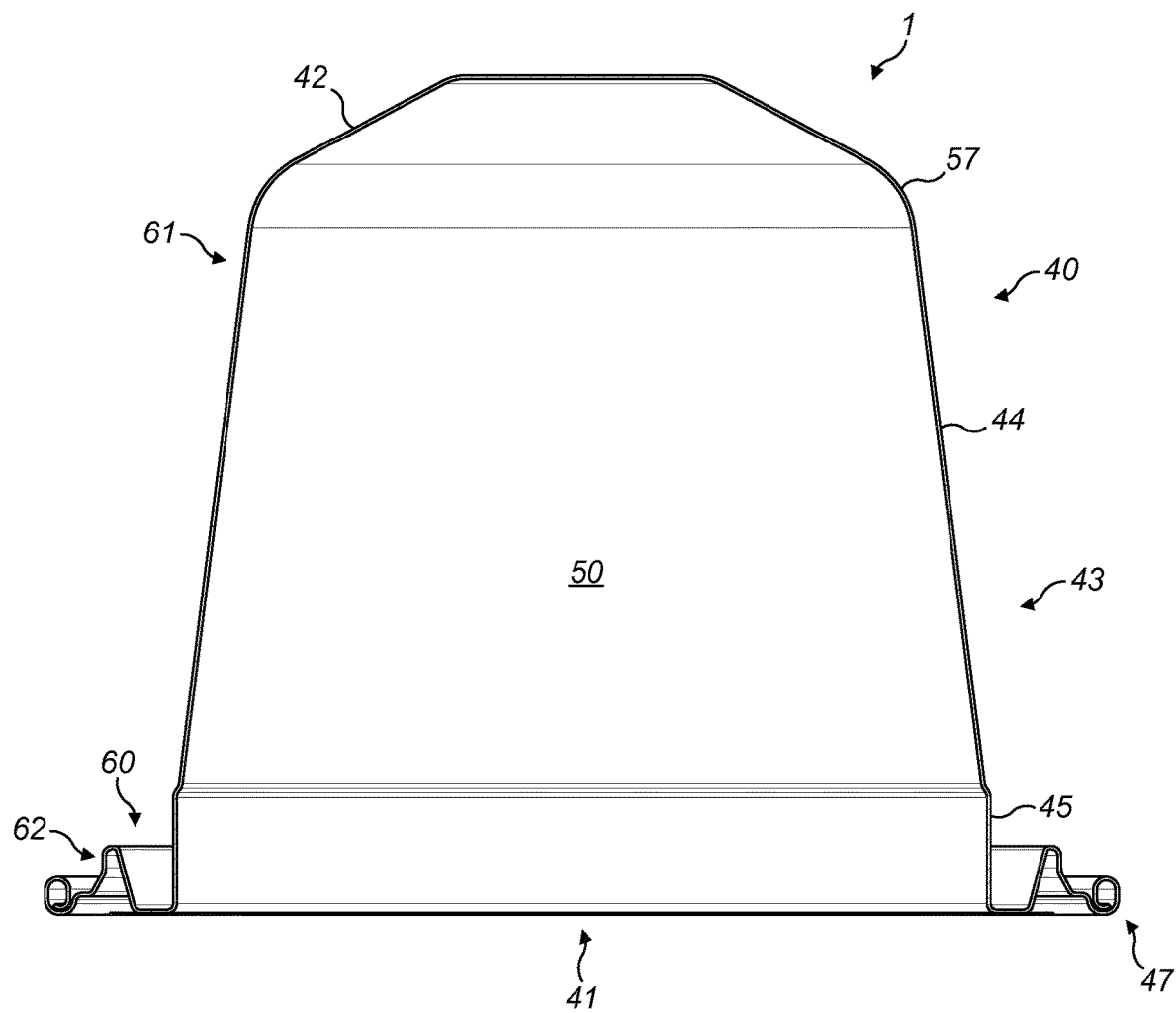
FIG. 13 is a cross-sectional view of a third example of capsule which may be formed according to the present disclosure.
Figure 14:
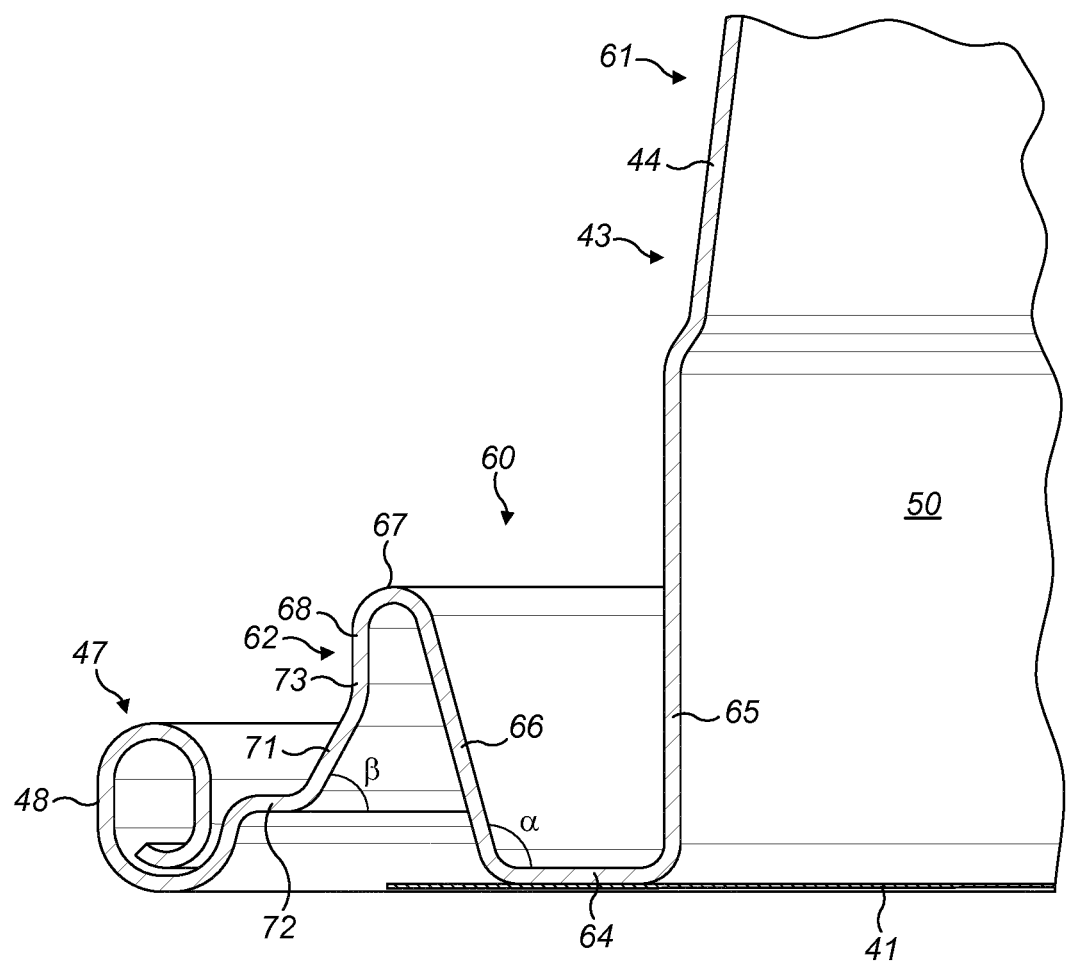
FIG. 14 is an enlarged view of a detail of FIG. 13.
Figure 15:
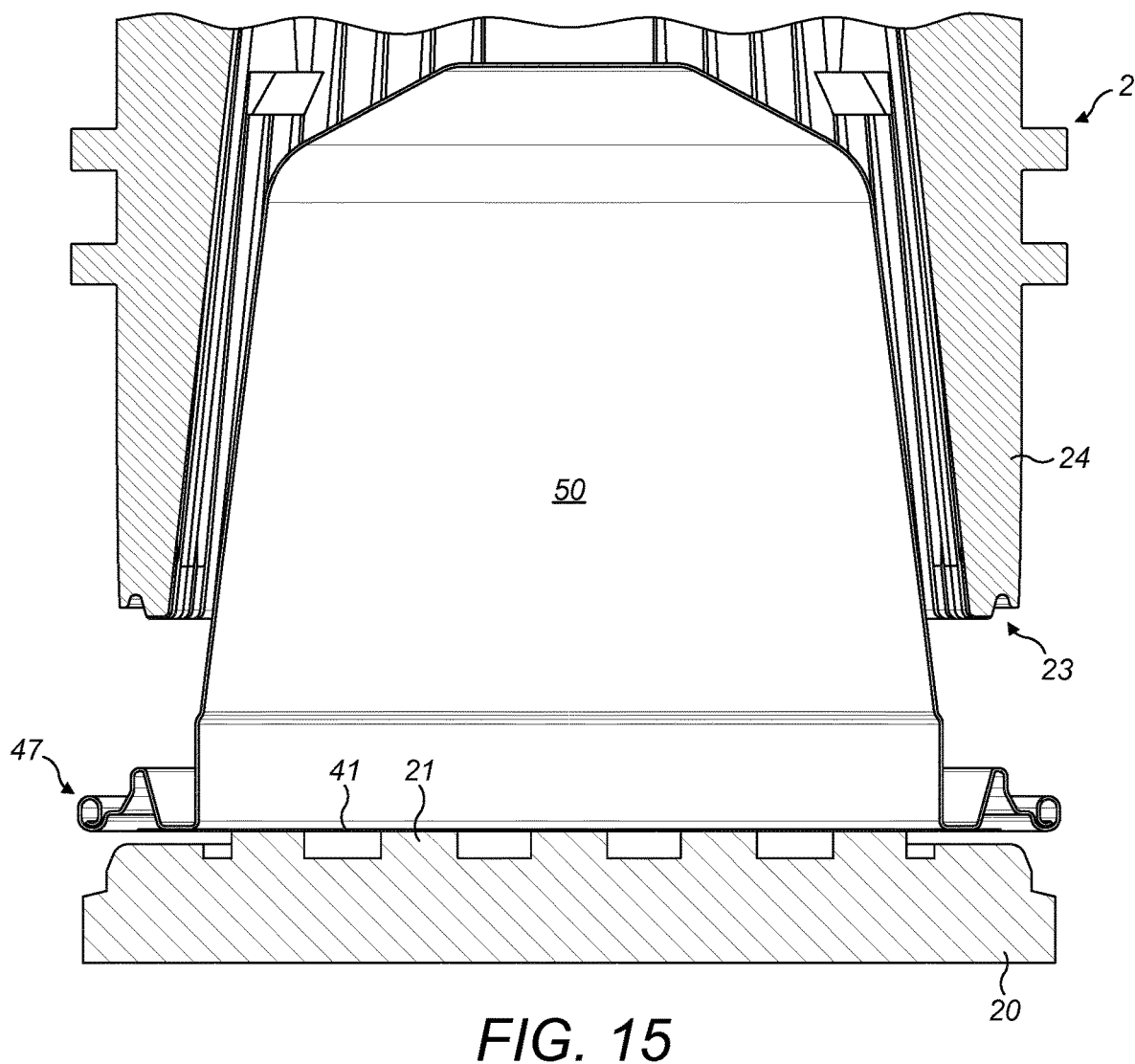
FIG. 15 is a schematic illustration of the capsule of FIG. 13 together with an enclosing member of a beverage preparation machine.
Figure 16:
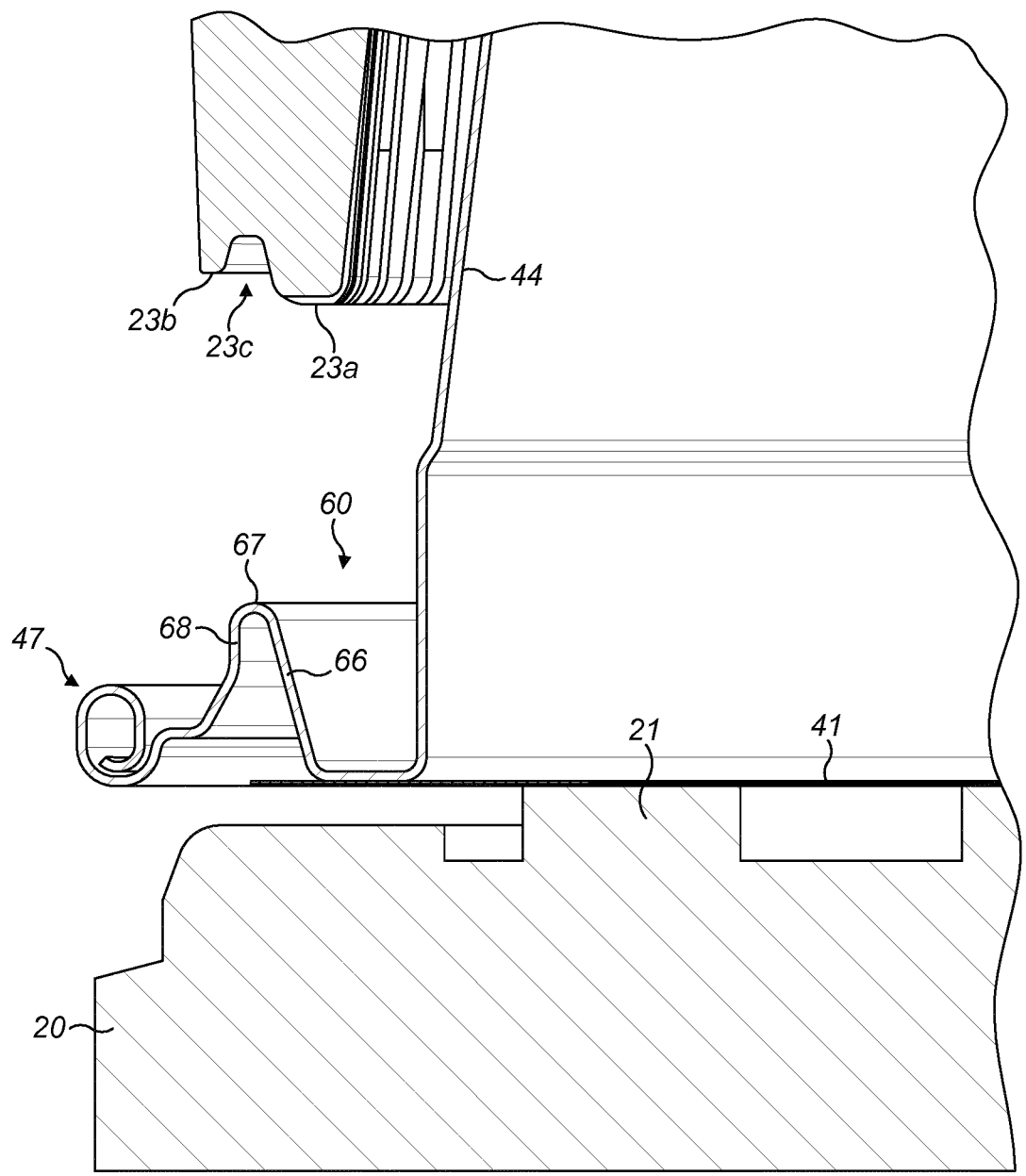
FIG. 16 is an enlarged view of a detail of FIG. 15.

As shown in FIGS. 11 and 12, on closing the enclosing member 2 relative to the capsule holder 20 the side wall 43 of the capsule 1 is contacted by the enclosing member 2 to deform the side wall 43. In particular, the inner rim 23a of the leading edge 23 is received in the annular trough 60 and bears on the outer wall 66 while at the same time (or shortly thereafter) the apex 67 of the ridge zone 63 is received in the recess 23c. The ridge zone 63 (and floor 64) is driven downwards by the action of the enclosing member 2 on the outer wall 66 and/or apex 67 causing the outer wall 66 of the annular trough 60 and the outer wall 68 of the ridge zone 63 to buckle and deform/crumple. During this movement the material of the outer wall 66 of the annular trough 60 may be plastically drawn over the leading edge 23 to conform the outer wall 66 of the annular trough 60 to the grooves or indentations to provide an effective seal.

The downward movement of the ridge zone 63 also nips the floor 64 (and the lid 41 sealed to the floor 64) against the capsule holder 20 as shown in FIG. 12.

The geometry of the outer wall 68 of the ridge zone 63, with the additional annular ridge 70 helps to stiffen the distal end of the side wall 43 and prevent the rim 47 being deflected down into contact with the capsule holder 20.

Downward movement of the enclosing member 2 may continue beyond the point illustrated in FIG. 12 until the inner rim 23a contacts and bears against the floor 64 of the annular trough 60.

Piercing and brewing of a beverage from the capsule 1 may be as described above in the first example.

FIGS. 13 to 18 illustrate a third example of capsule 1. Features corresponding to those of the first and/or second example are denoted by corresponding reference signs. Features of the first and/or second example and this example may be interchanged and combined as desired. In addition, in the following description only differences between the examples will be described in detail. In other respects the reader is directed to the description of the prior examples.

The cup-shaped body 40 differs from that of the first and second examples in the configuration and geometry of the annular trough 60. As in the second example, the annular trough 60 is dimensioned to receive, partially or wholly, the leading edge 23 of the enclosing member 2 on movement of the enclosing member 2 into the closed position. The inner wall 65 of the annular trough 60 is substantially perpendicular to the floor 64 and the outer wall 66 is angled relative to the floor 64, such that an internal angle α at a junction between the floor 64 and the outer wall 66 is from 90° to 120°, preferably 105°.

The ridge zone 63 is again located radially outwards of the annular trough 60 and comprises an annular projection which extends back in the general direction of the base 42 such that an apex 67 of the ridge zone 63 is raised above the level of the floor 64 of the annular trough 60. The apex 67 is somewhat more rounded than in the second example. The apex 67 may be raised above the floor 64 by a distance from 0.75 to 2.5 mm. As illustrated in this example, the distance is 2.2 mm. The ridge zone 63 may be formed to have an inner wall provided by the angled outer wall 66 of the annular trough 60 and an outer wall 68 formed by at least a portion of the second side wall section 62. As shown most clearly in FIG. 14, the outer wall 68 comprises three distinct sections—an upper section 73 which, prior to insertion, is perpendicular to the floor 64, a mid-section 71 that is angled at an angle β of from 20 to 80°, preferably 60°, to the vertical and a lower section 72 that includes a horizontal portion—parallel to the floor 64—before merging into the rolled-over portion 48 of the rim 47.

The side wall 43, including the annular trough 60 and the ridge zone 63 may be formed integrally. Further, the cup-shaped body 40 including the side wall 43 and the base 42 may be formed integrally.

The annular trough 60 may have an internal width of from 1.3 to 2.0 mm. As illustrated, the annular trough 60 has an internal width of approximately 1.5 mm to 1.8 mm.

As illustrated, the lid 41 is sealed to the annular trough 60. In particular, the lid 41 is sealed to an inner surface of the floor 64 of the annular trough 60. The floor 64 of the annular trough 60 is substantially level with a distal end of the side wall 43 prior to insertion. As illustrated the offset from the distal end of the side wall 43 and the lid is only 0.2 mm.

In use of the beverage preparation system, as shown in FIGS. 15 to 18, as before the enclosing member 2 is first moved into the open position and the capsule 1 is inserted into a location in between the capsule holder 20 and the enclosing member 2.

Figure 17:
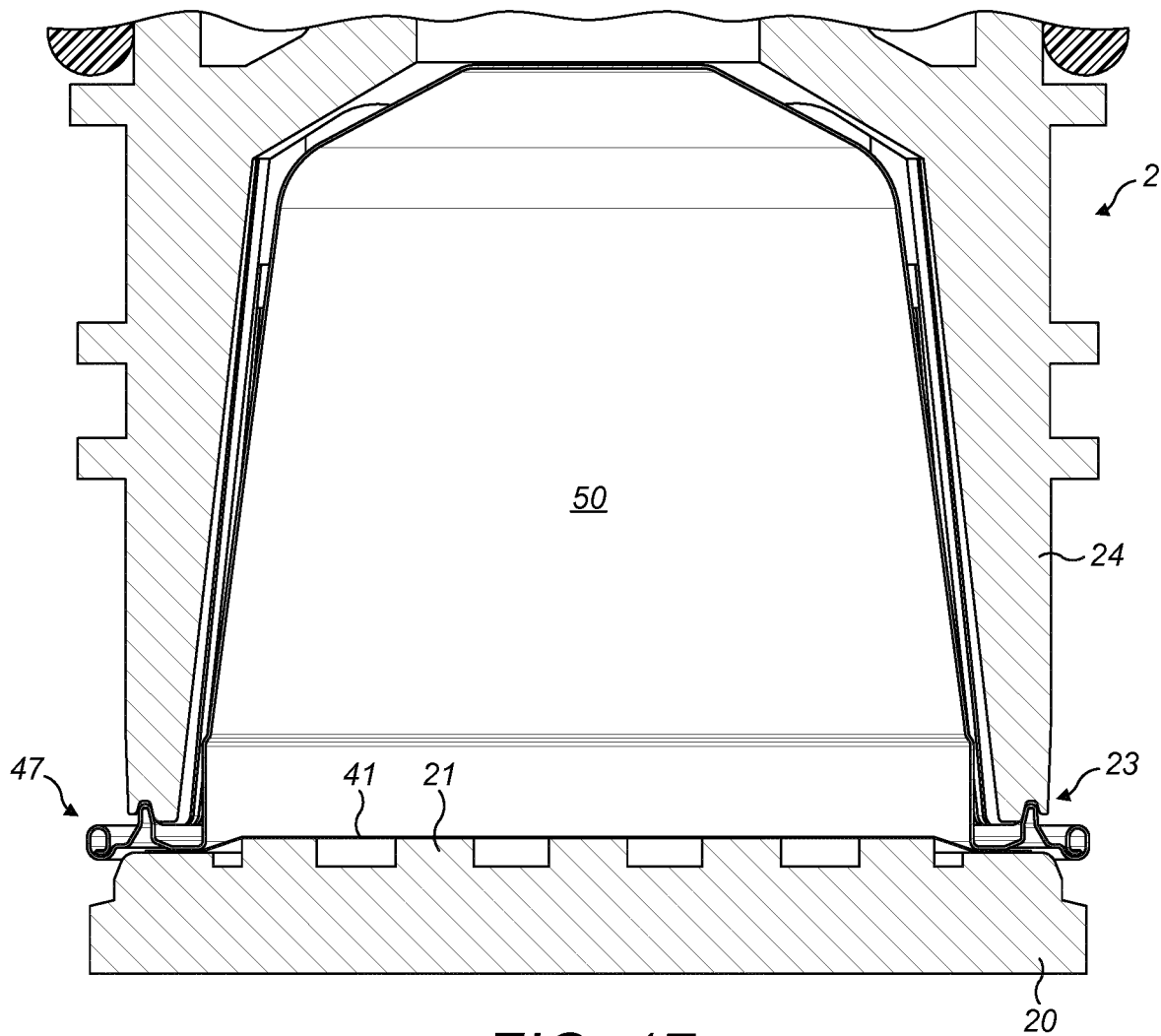
FIG. 17 is a schematic illustration of the arrangement of FIG. 15 with the enclosing member in a closed position.
Figure 18:
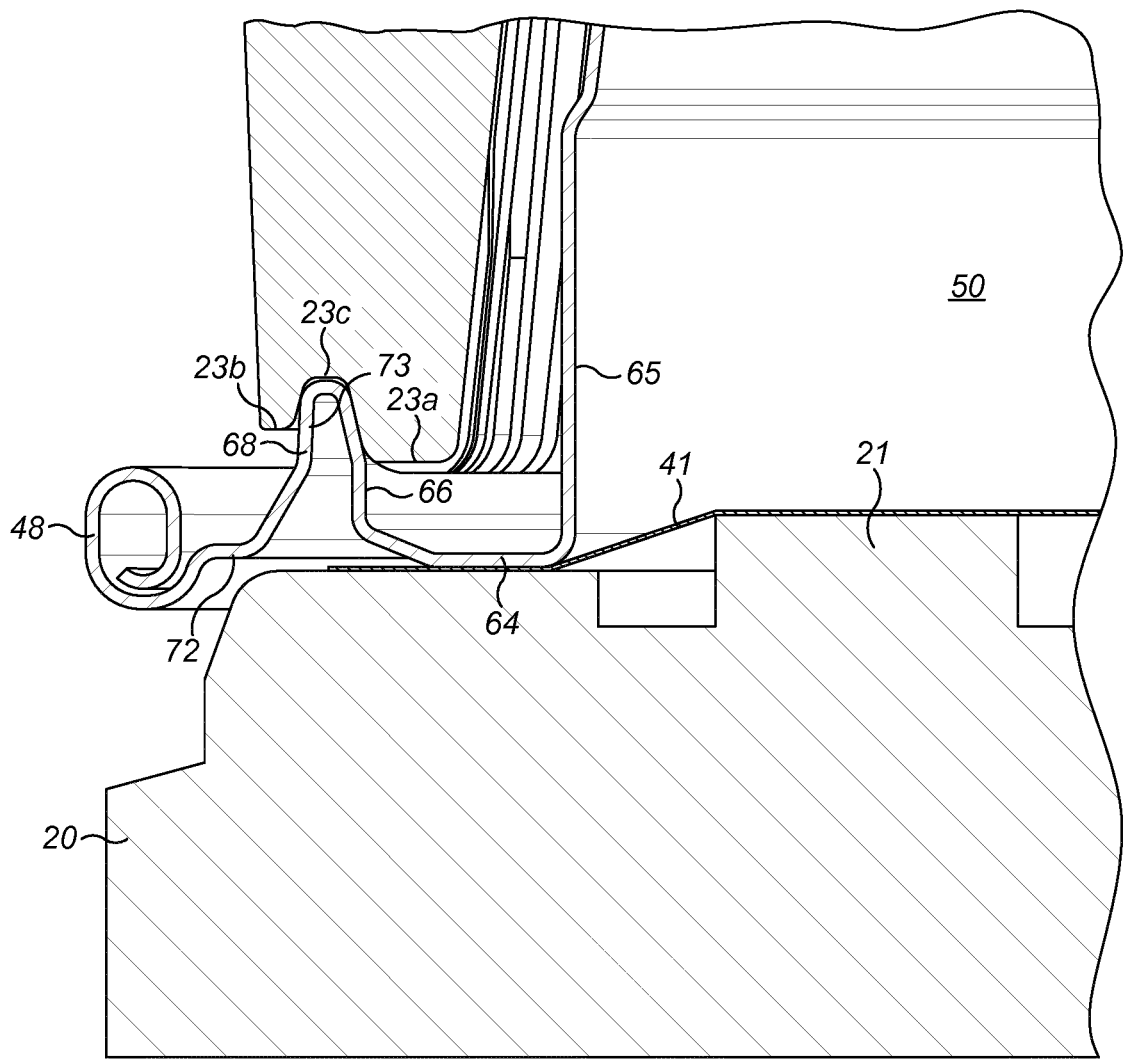
FIG. 18 is an enlarged view of a detail of FIG. 17.

As shown in FIGS. 17 and 18, on closing the enclosing member 2 relative to the capsule holder 20 the side wall 43 of the capsule 1 is contacted by the enclosing member 2 to deform the side wall 43. In particular, the inner rim 23a of the leading edge 23 is received in the annular trough 60 and bears on the outer wall 66 while at the same time (or shortly thereafter) the apex 67 of the ridge zone 63 is received in the recess 23c. The ridge zone 63 (and floor 64) is driven downwards by the action of the enclosing member 2 on the outer wall 66 and/or apex 67 causing the outer wall 66 of the annular trough 60 and the outer wall 68 of the ridge zone 63 to buckle and deform/crumple. During this movement the material of the outer wall 66 of the annular trough 60 may be plastically drawn over the leading edge 23 to conform the outer wall 66 of the annular trough 60 to the grooves or indentations to provide an effective seal.

The downward movement of the ridge zone 63 also nips the floor 64 (and the lid 41 sealed to the floor 64) against the capsule holder 20 as shown in FIG. 12.

The geometry of the outer wall 68 of the ridge zone 63, with the upper section 73, mid-section 71 and lower section 72 helps to stiffen the distal end of the side wall 43 and prevent the rim 47 being deflected down into contact with the capsule holder 20.

Downward movement of the enclosing member 2 may continue beyond the point illustrated in FIG. 12 until the inner rim 23a contacts and bears against the floor 64 of the annular trough 60.

Piercing and brewing of a beverage from the capsule 1 may be as described above in the first example.

The cup-shaped bodies 40 of the capsules 1 of the above examples are formed according to the following method.

Figure 19:
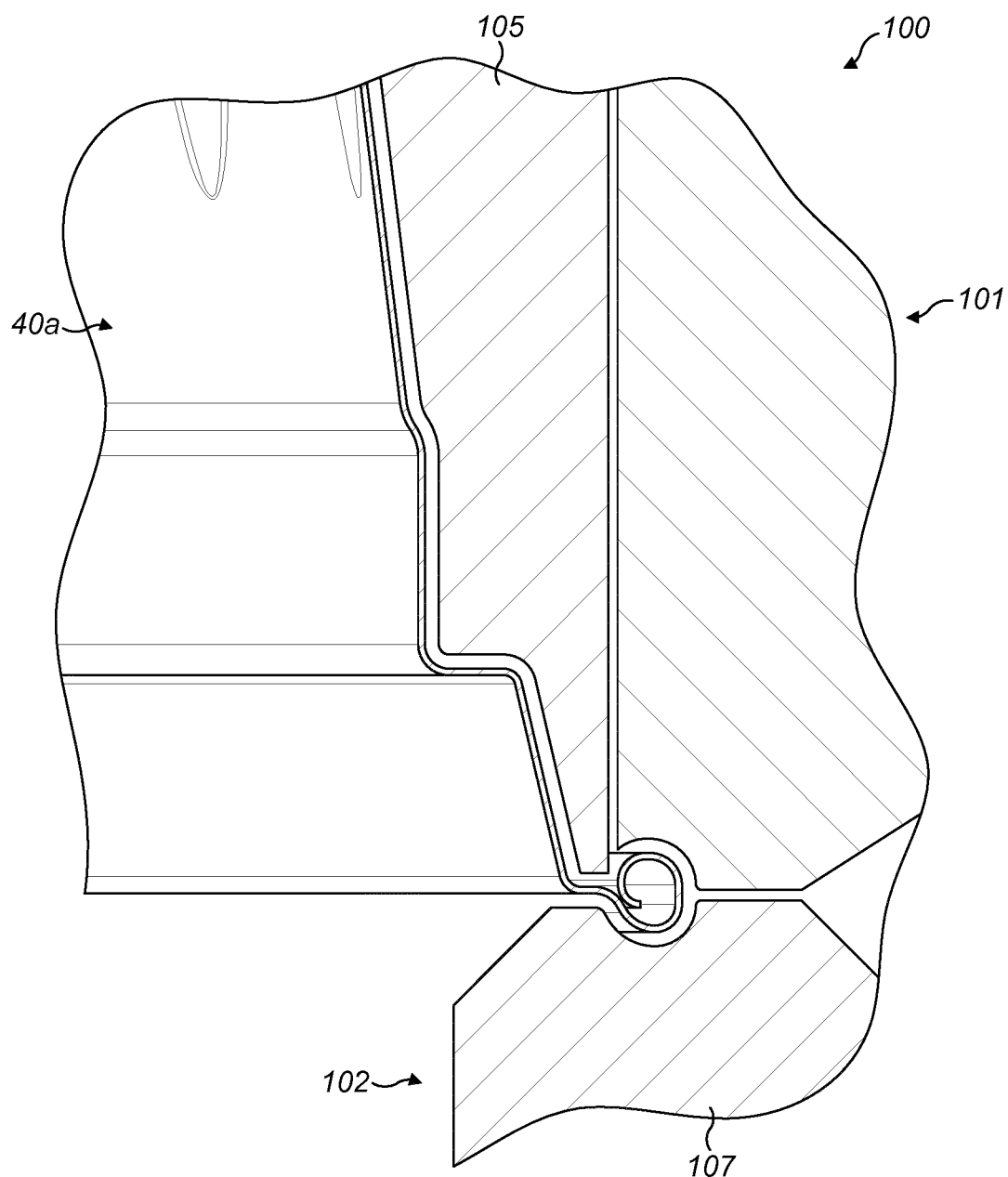
FIG. 19 is a schematic cross-sectional view of a section of a first rig for forming a cup-shaped body preform of a capsule.

FIG. 19 illustrates a section of a deep drawing first rig 100 for forming a preform of the cup-shaped body 40. The first rig 100 comprises an upper half 101 and a lower half 102.

A cup-shaped body preform 40a is configured by the shaping of the tool pieces held in the upper half 101 and the lower half 102 and the relative movement thereof. The method of forming the cup-shaped body 40 comprises two sequential stages. In a first stage a sheet of material is deep drawn by the first rig 100 to form the cup-shaped body preform 40a. In a second and subsequent stage the cup-shaped body preform 40a is transformed into the cup-shaped body 40 by further drawing of the sheet material of the cup-shaped body preform 40a in a second rig 160 that will be described further below.

The upper half 101 of the first rig 100 may comprise a central upper tool surrounded by a cylindrical upper tool 105, both of which may be mounted within an upper frame. The central upper tool may be shaped to configure an outer surface of the base 42 of the cup-shaped body preform 40a. The cylindrical upper tool 105 is shaped to configure an outer surface of the side wall of the cup-shaped body preform 40a during the first stage of the drawing process.

The lower half 102 of the first rig 100 may hold a central bottom tool surrounded by a cylindrical bottom tool 107, both of which may be mounted within a lower frame. The central bottom tool (omitted from FIG. 19 for clarity) may be shaped to configure an inner surface of the base 42 and a portion of the side wall of the cup-shaped body preform 40a. The cylindrical bottom tool 107 is shaped to configure an inner surface of a distal portion of the side wall of the cup-shaped body preform 40a during the first stage of the drawing process.

In the first stage of the drawing process a sheet of material, for example a sheet of aluminium, is placed in the first rig 100 and the upper frame and lower frame are brought together to clamp the sheet of material therebetween. At this point the sheet of material may be nipped between the distal ends of the cylindrical upper tool 105 and the cylindrical bottom tool 107.

The central bottom tool is then driven upwards into the cavity defined by the upper half 101. Consequently, the sheet of material is drawn into the shape shown in FIGS. 19 and 20 by inter-engagement of the central upper tool and the central bottom tool and engagement of the cylindrical upper tool 105 and the cylindrical bottom tool 107 to form the cup-shaped body preform 40a.

Figure 20:
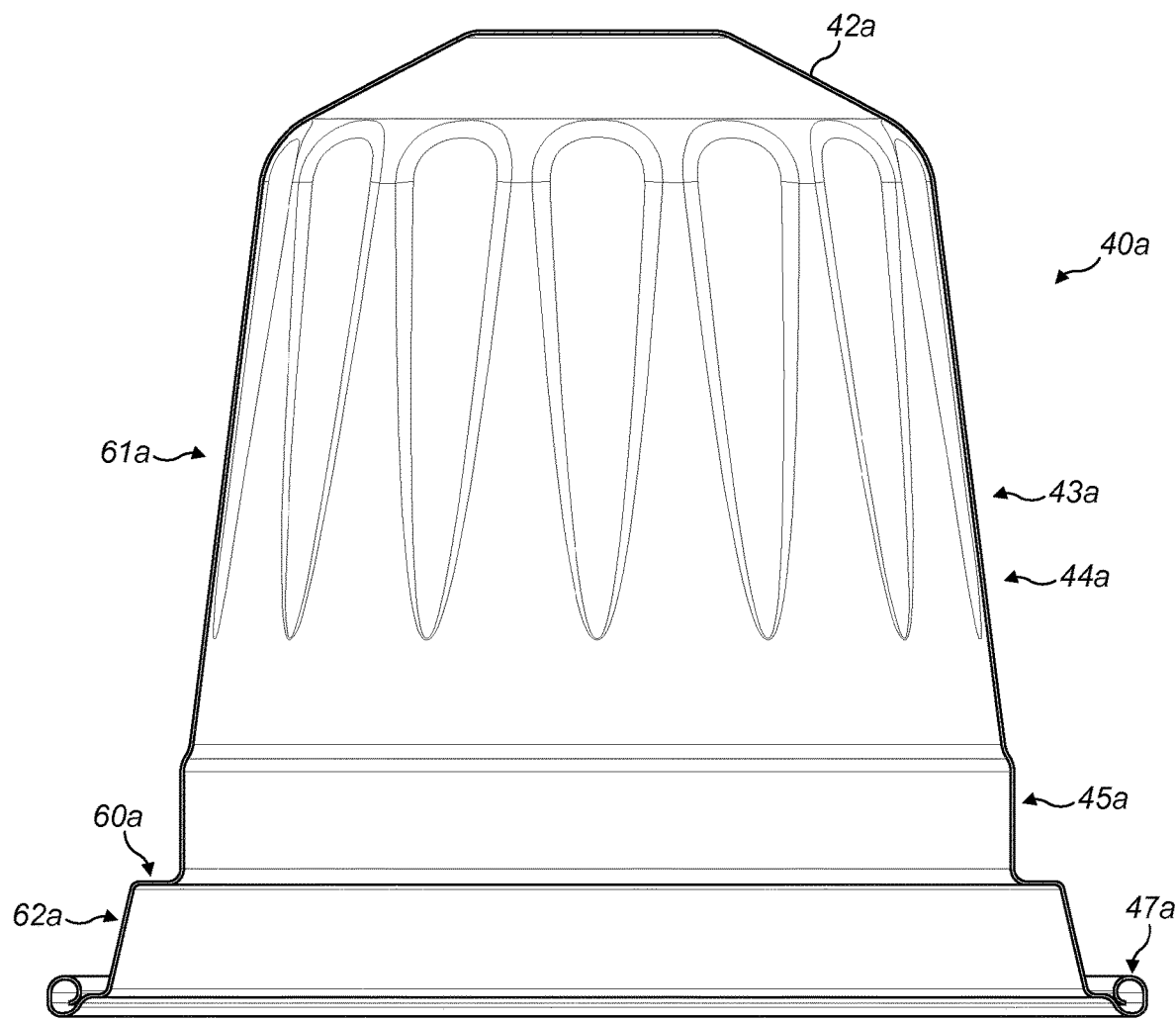
FIG. 20 is a cross-sectional view of a cup-shaped body preform formed using the first rig of FIG. 19.
Figure 21:
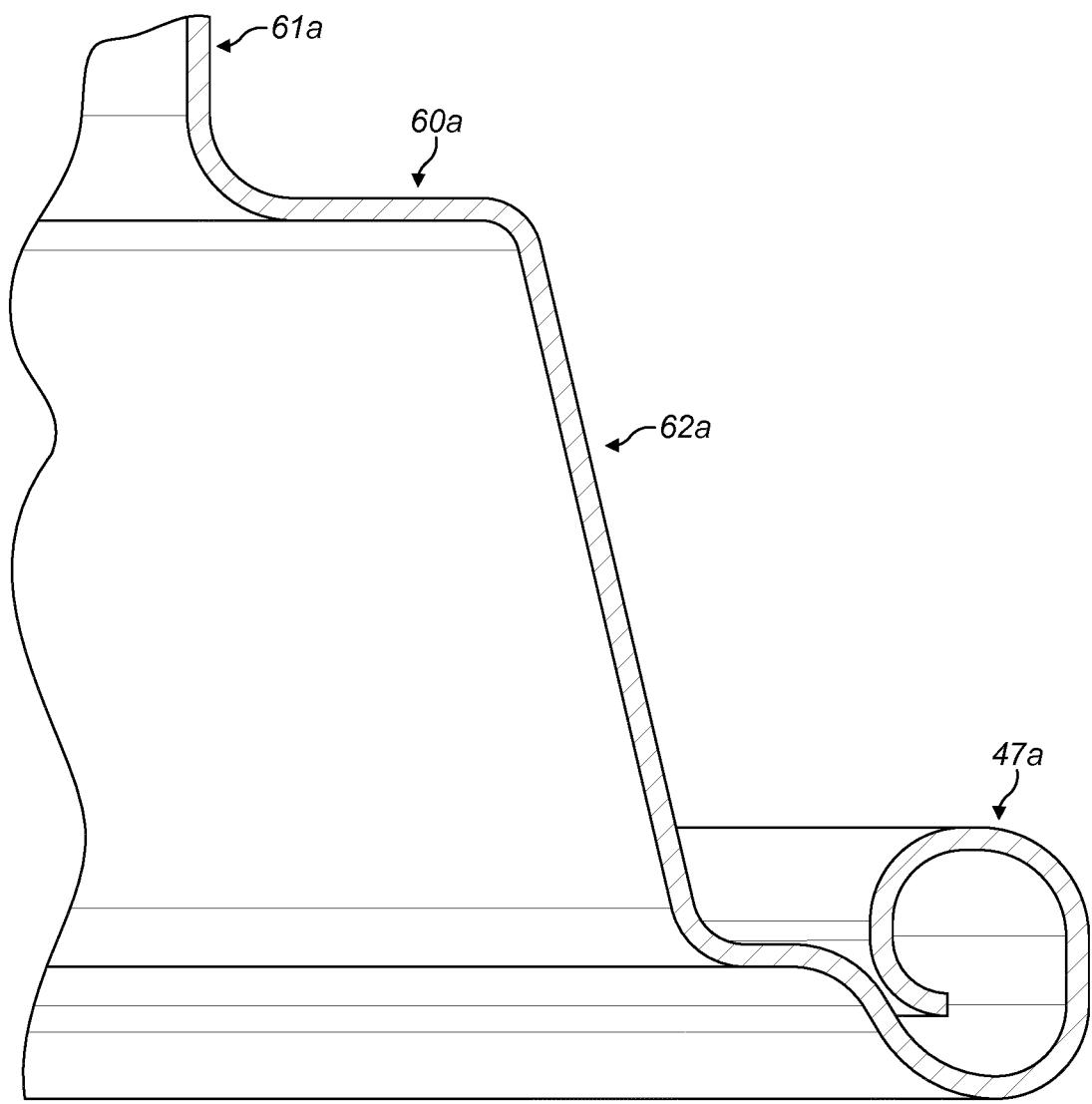
FIG. 21 is an enlarged view of a portion of FIG. 20.

As most clearly seen in FIG. 20, the cup-shaped body preform 40a comprises a base 42a and a preformed side wall 43a which extends from the base 42a to a rim 47a which is rolled over.

The preformed side wall 43a comprises an outwardly-extending step 60a proximate the rim 47a, a primary side wall section 61a extending between the base 42a and the outwardly-extending step 60a, and a secondary side wall section 62a extending between the outwardly-extending step 60a and the rim 47a. The outwardly-extending step 60a is angled at 90° to a central longitudinal axis of the cup-shaped body preform 40a. The primary side wall section 61a may comprise a frustoconical section 44a proximate the base 42a and a cylindrical section 45a distal the base 42a. The secondary side wall section 62a comprises a frusto-concical section, which is divergent in the direction of the rim 47a.

Figure 22:
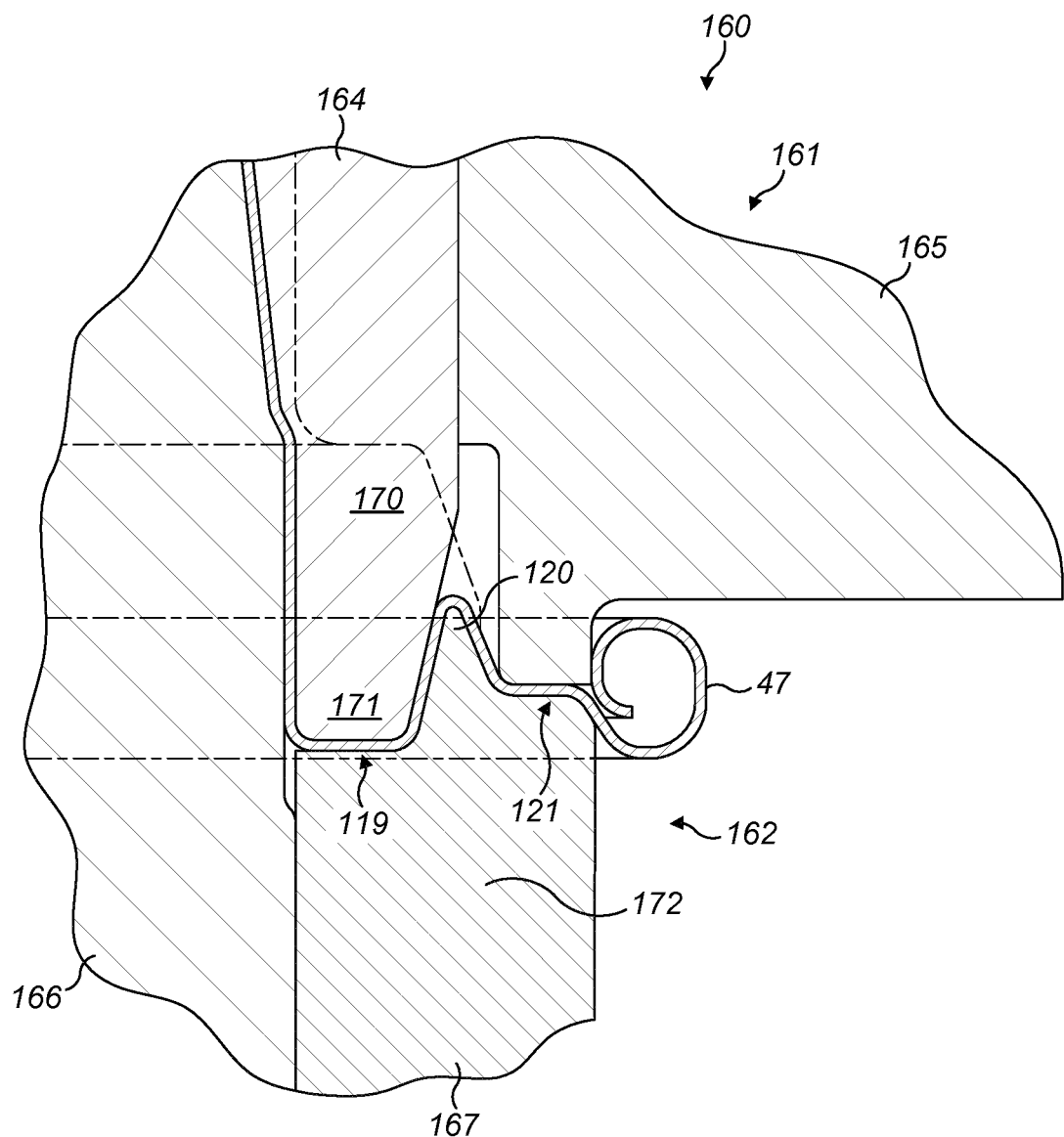
FIG. 22 is a schematic cross-sectional view of a section of a second rig for transforming the cup-shaped body preform into a cup-shaped body for a capsule in a first position.

For the second stage of the drawing process the second rig 160 is used as shown in FIG. 22. The second rig 160 comprises an upper half 161 and a lower half 162. The upper half 161 of the second rig 160 may comprise a central upper tool surrounded by a cylindrical inner upper tool 164, and a cylindrical outer upper tool 165. The central upper tool and the cylindrical inner upper tool 164 may be biased apart by springs. The central upper tool may be shaped to configure (or maintain the preformed shape of) an outer surface of the base 42 of the cup-shaped body 40. The cylindrical inner upper tool 164 is shaped to configure an outer surface of the side wall of the cup-shaped body 40 during the second stage of the drawing process. The cylindrical outer upper tool 165 is shaped to configure shape of a portion of the side wall near the rim during the second stage of the drawing process.

The lower half 162 of the second rig 160 holds a central bottom tool 166 surrounded by a cylindrical bottom tool 167. The central bottom tool 166 is shaped to hold and support the cup-shaped body preform 40a during the second drawing stage and in particular to support an inner surface of a portion of the preformed side wall. The cylindrical bottom tool 167 is shaped to configure the shape of a distal portion of the side wall of the cup-shaped body preform 40a during the second stage of the drawing process.

Figure 23:
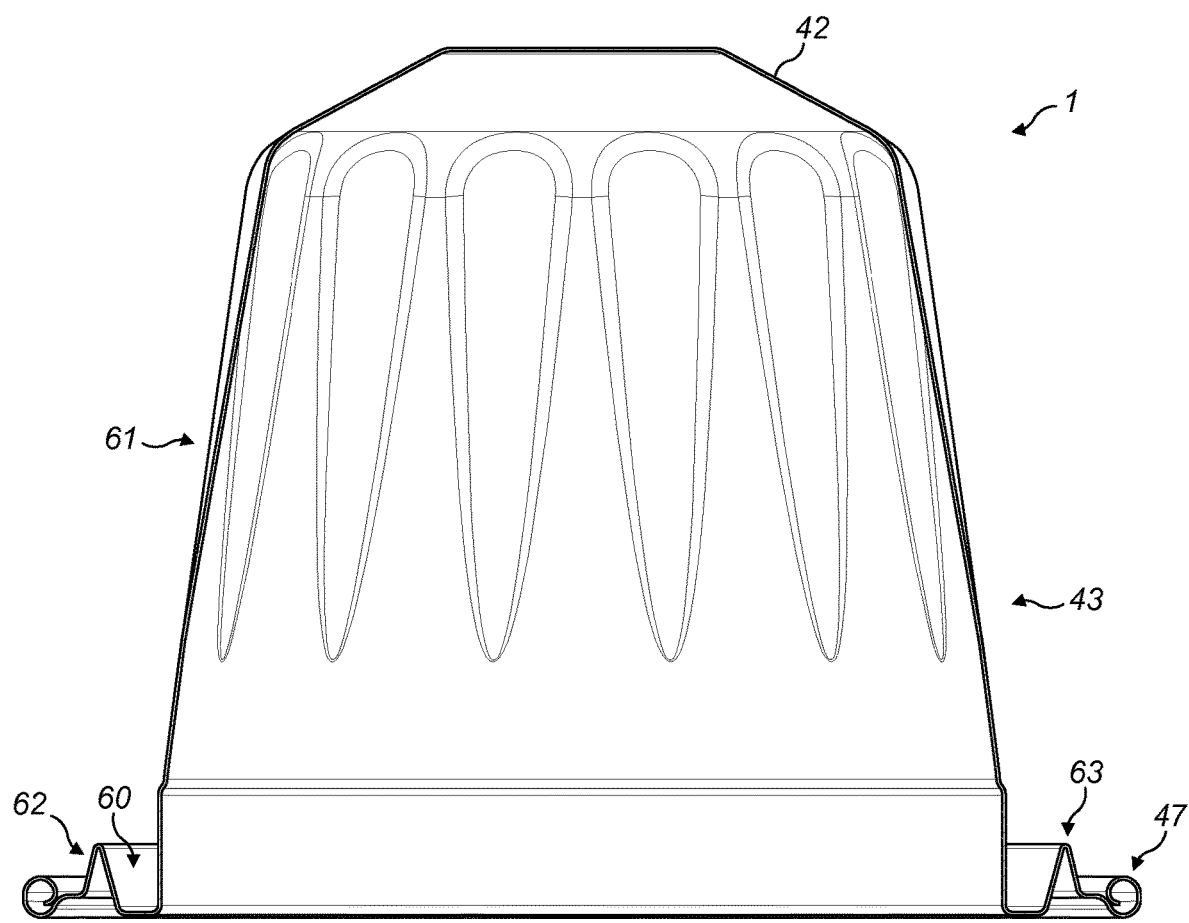
FIG. 23 is a cross-sectional view of a cup-shaped body formed using the second rig of FIG. 22.
Figure 24:
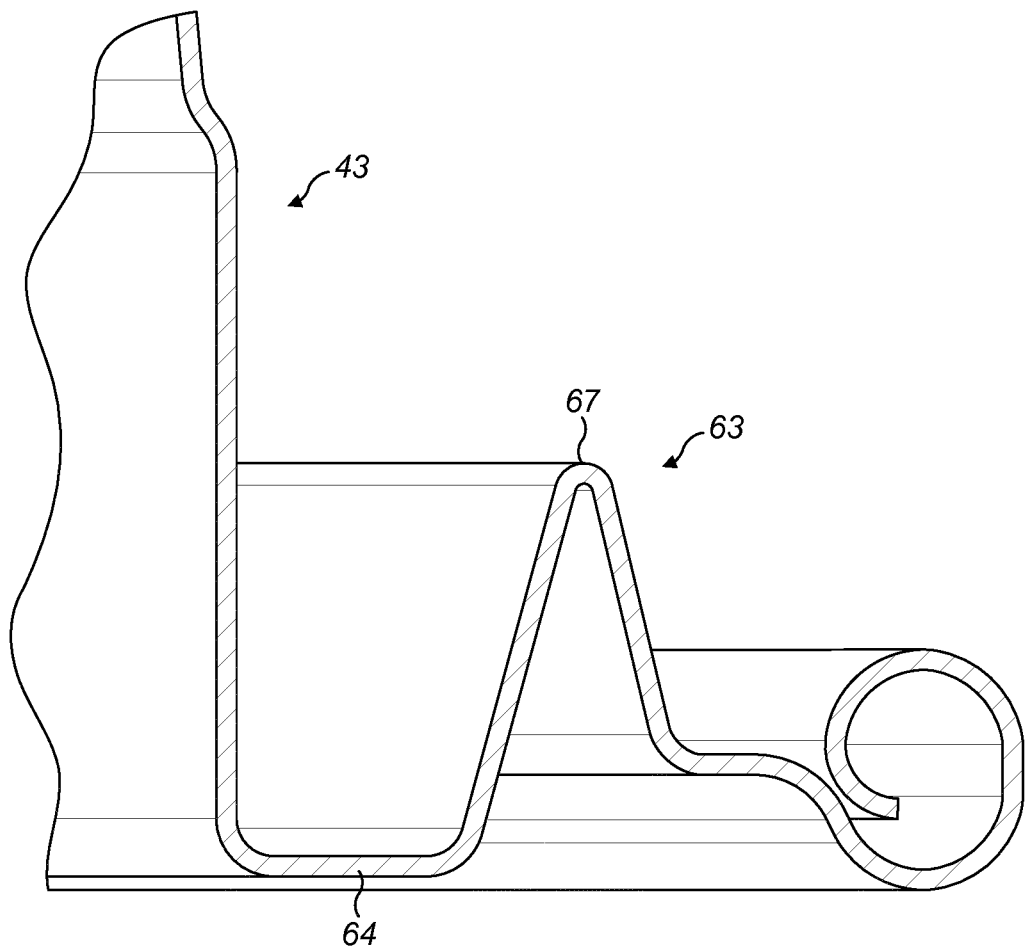
FIG. 24 is an enlarged view of a portion of FIG. 23.

During the second drawing stage the cup-shaped body preform 40a is removed from the first rig 100 and positioned in the second rig 160 with the preform mounted on the central bottom tool 166. After placing the cup-shaped body preform 40a in the second rig 160 the cylindrical inner upper tool is replaced and the second rig 160 is driven to a closed position as shown in FIG. 22. During a first closing movement the cylindrical inner upper tool 164 is moved relative to the cylindrical outer upper tool 165 until they contact each other. Thereafter the cylindrical inner upper tool 164 and the cylindrical outer upper tool 165 move in unison. During closure a distal end 170 of the cylindrical inner upper tool 164, which comprises a narrowed and tapered lip 171, contacts the outwardly-extending step 60a of the cup-shaped body preform 40a and drives the material of the step downwards. A distal end 172 of the cylindrical bottom tool 167 comprises a ridge 120 in between a lower inner land 119 and an intermediate outer land 121. The lip 171 is received inside of the ridge 120 so that, as shown in FIG. 22, the outwardly-extending step 60a (together with optionally a portion of the secondary side wall section 62a) is folded into the desired shape, as shown in FIGS. 23 and 24, which comprises the annular trough 60, the first side wall section 61 extending between the base 42 and the annular trough 60, and the second side wall section 62 extending between the annular trough 60 and the rim 47. Further the ridge 120 forms the ridge zone 63 located radially outwards of the annular trough 60.

The frustoconical section 44a of the primary side wall section 61a may be substantially or wholly unaffected by the transformation of the second stage and thereby forms the frustoconical section 44 of the first side wall section 61 of the cup-shaped body 40.

The invention claimed is:

1. A method of forming a cup-shaped body for a beverage capsule comprising the steps of:
   a) in a first stage drawing a sheet of material into a cup-shaped body preform; and
   b) in a second stage transforming the cup-shaped body preform into the cup-shaped body;
   wherein after the first stage the cup-shaped body preform comprises a base and a preformed side wall which extends from the base to a rim; wherein the preformed side wall comprises:
   an outwardly-extending step proximate the rim;
   a primary side wall section extending between the base and the outwardly-extending step; and
   a secondary side wall section extending between the outwardly-extending step and the rim;
   wherein in the second stage the preformed side wall is deformed such that the cup-shaped body comprises the base and a side wall which extends from the base to the rim; wherein the side wall comprises:
   an annular trough, wherein the annular trough comprises an inner wall, an outer wall and a floor;
   a first side wall section extending between the base and the annular trough; and
   a second side wall section extending between the annular trough and the rim,
   wherein the second side wall section defines a ridge zone located radially outwards of the annular trough and the ridge zone is formed during the second stage by deformation of the outwardly-extending step and/or the secondary side wall section,
   wherein the ridge zone comprises a ridge zone inner wall provided by the outer wall of the annular trough and a ridge zone outer wall formed by at least a portion of the second side wall section, wherein the ridge zone inner wall is arranged radially inwards of the ridge zone outer wall; and
   wherein the sheet of material comprises an aluminum material.

2. The method of claim 1, wherein the outwardly-extending step is angled at 90° to a central longitudinal axis of the cup-shaped body preform.

3. The method of claim 1, wherein the primary side wall section comprises a frusto-conical section proximate the base.

4. The method of claim 3, wherein the frusto-conical section of the primary side wall section is substantially or wholly unaffected by the transformation of the second stage and thereby forms a frusto-conical section of the first side wall section.

5. The method of claim 3, wherein the primary side wall section comprises a cylindrical section between the frusto-conical section and the outwardly-extending step.

6. The method of claim 1, wherein the secondary side wall section comprises a frusto-conical section.

7. The method of claim 6, wherein the frusto-conical section is divergent in the direction of the rim.

8. The method of claim 1, wherein the outer wall is angled relative to the floor, such that an internal angle at a junction between the floor and the outer wall is from 90° to 120°.

9. The method of claim 1, wherein the cup-shaped body preform is formed from an integral sheet of material.

10. The method of claim 1, wherein the cup-shaped body preform is formed by deep drawing the sheet of material.

11. The method of claim 1, wherein the cup-shaped body preform is formed by cold deep drawing the sheet of material.

12. The method of claim 1, wherein the outer wall is angled relative to the floor, such that an internal angle at a junction between the floor and the outer wall is 105°.

13. The method of claim 1 wherein the floor of the annular trough is arranged below an apex of the ridge zone.

14. The method of claim 1 wherein ridge zone comprises an annular projection which extends in the general direction of the base such that an apex of the ridge zone is raised above the level of the floor of the annular trough.

15. The method of claim 1 wherein the ridge zone is formed from the sheet material.

16. The method of claim 1 wherein the annular trough and the ridge zone are integrally formed.

17. The method of claim 1 wherein the rim defines the outermost portion of the cup-shaped body.

* * * * *